(12) United States Patent
Tokuchi

(10) Patent No.: US 11,015,379 B2
(45) Date of Patent: May 25, 2021

(54) APPARATUS, MANAGEMENT SYSTEM, AND NON-TRANSITORY COMPUTER READABLE MEDIUM FOR ENTRANCE CONTROL

(71) Applicant: FUJI XEROX CO., LTD., Tokyo (JP)

(72) Inventor: Kengo Tokuchi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 77 days.

(21) Appl. No.: 16/115,581

(22) Filed: Aug. 29, 2018

(65) Prior Publication Data

US 2019/0128046 A1 May 2, 2019

(30) Foreign Application Priority Data

Oct. 26, 2017 (JP) .............................. JP2017-207335

(51) Int. Cl.
| | | |
|---|---|---|
| *E05F 15/73* | (2015.01) | |
| *G08B 3/10* | (2006.01) | |
| *G05B 15/02* | (2006.01) | |
| *G06Q 10/02* | (2012.01) | |
| *E05F 15/70* | (2015.01) | |
| *H04N 7/18* | (2006.01) | |
| *E05F 15/75* | (2015.01) | |

(52) U.S. Cl.
CPC .............. *E05F 15/73* (2015.01); *E05F 15/70* (2015.01); *G05B 15/02* (2013.01); *G06Q 10/02* (2013.01); *G08B 3/10* (2013.01); *E05F 15/75* (2015.01); *E05F 2015/767* (2015.01); *E05Y 2900/132* (2013.01); *H04N 7/188* (2013.01)

(58) Field of Classification Search
CPC . E05F 15/73; E05F 15/70; E05F 15/75; E05F 2015/767; G08B 3/10; G06Q 10/02; G05B 15/02; H04N 7/188; E05Y 2900/132
See application file for complete search history.

(56) References Cited

U.S. PATENT DOCUMENTS

| | | | | |
|---|---|---|---|---|
| 5,845,692 A | * | 12/1998 | Kellem | ................... E05G 5/003 160/118 |
| 8,857,569 B2 | * | 10/2014 | Friedli | ................... B66B 5/0012 187/384 |
| 10,030,885 B1 | * | 7/2018 | Yu | ........................... G05B 15/02 |
| 2004/0188185 A1 | * | 9/2004 | Pieper | ..................... B66B 1/468 187/391 |
| 2010/0194566 A1 | * | 8/2010 | Monden | .................... G07C 9/00 340/568.1 |
| 2011/0257926 A1 | * | 10/2011 | Stabler | ..................... F24D 19/10 702/136 |
| 2012/0072032 A1 | * | 3/2012 | Powell | ..................... F24F 11/30 700/278 |

(Continued)

FOREIGN PATENT DOCUMENTS

| | | |
|---|---|---|
| JP | 2004086582 | 3/2004 |
| JP | 2004300683 | 10/2004 |

(Continued)

*Primary Examiner* — Jason Lin
*Assistant Examiner* — Olvin Lopez Alvarez
(74) *Attorney, Agent, or Firm* — JCIPRNET

(57) ABSTRACT

An apparatus includes a controller. The controller performs control so as to set an entrance in a state in which the entrance is open if the number of people detected in a space is greater than the number of people reserving the space.

32 Claims, 22 Drawing Sheets

(56) References Cited

U.S. PATENT DOCUMENTS

| | | | | |
|---|---|---|---|---|
| 2013/0132271 A1* | 5/2013 | Daniel | ................... | G06F 21/10 705/39 |
| 2013/0245827 A1* | 9/2013 | Shetty | ................... | B25J 9/1697 700/259 |
| 2013/0293718 A1* | 11/2013 | M | ................... | G08B 13/19671 348/152 |
| 2014/0211003 A1* | 7/2014 | Lee | ................... | H04N 7/181 348/143 |
| 2014/0222210 A1* | 8/2014 | Agarwal | ................ | G05B 15/02 700/275 |
| 2015/0323943 A1* | 11/2015 | Chan | ................... | G05D 23/1951 700/278 |
| 2016/0134932 A1* | 5/2016 | Karp | ................... | H04W 4/80 348/155 |
| 2016/0212279 A1* | 7/2016 | Nemoto | ............... | H04N 1/0088 |
| 2016/0261425 A1* | 9/2016 | Horton | ................ | H04L 12/2816 |
| 2016/0300468 A1* | 10/2016 | Stricker | ................ | G08B 21/02 |
| 2017/0205105 A1* | 7/2017 | Adam | ................... | F24F 11/30 |
| 2018/0012432 A1* | 1/2018 | Shin | ................... | G07C 9/00563 |
| 2018/0030759 A1* | 2/2018 | Chanbonpin | ....... | E05B 47/0001 |
| 2018/0113897 A1* | 4/2018 | Donlan | ................. | G06F 16/285 |
| 2018/0204470 A1* | 7/2018 | Rezvani | ............... | B64C 39/024 |
| 2018/0350170 A1* | 12/2018 | Wang | .................. | G07C 9/00309 |
| 2019/0130688 A1* | 5/2019 | Tokuchi | ............... | G07C 9/00309 |
| 2019/0130729 A1* | 5/2019 | Tokuchi | ............... | G08B 21/22 |
| 2019/0180591 A1* | 6/2019 | Tokuchi | ............... | G08B 5/22 |
| 2019/0259110 A1* | 8/2019 | Farrar | ................. | G06Q 30/0255 |

FOREIGN PATENT DOCUMENTS

| | | | | |
|---|---|---|---|---|
| JP | 2005272088 | * | 10/2005 | ............. E05F 15/73 |
| JP | 2006325064 | * | 11/2006 | ............. B66B 13/14 |
| JP | 2017050000 | | 3/2017 | |
| KR | 101297112 | * | 8/2013 | ............. G06Q 50/12 |
| WO | WO-2017104071 A1 | * | 6/2017 | ............. B66B 13/14 |

* cited by examiner

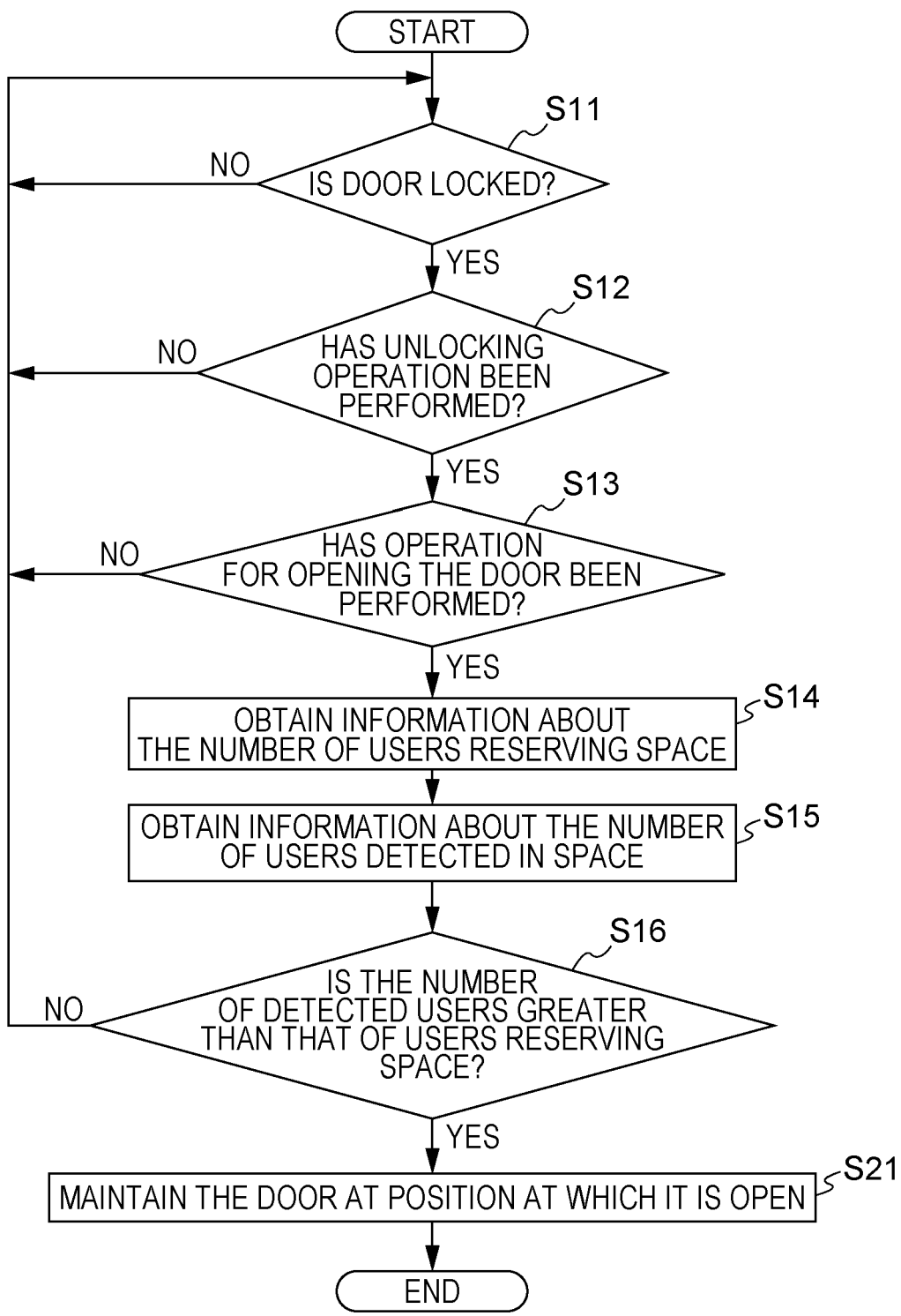

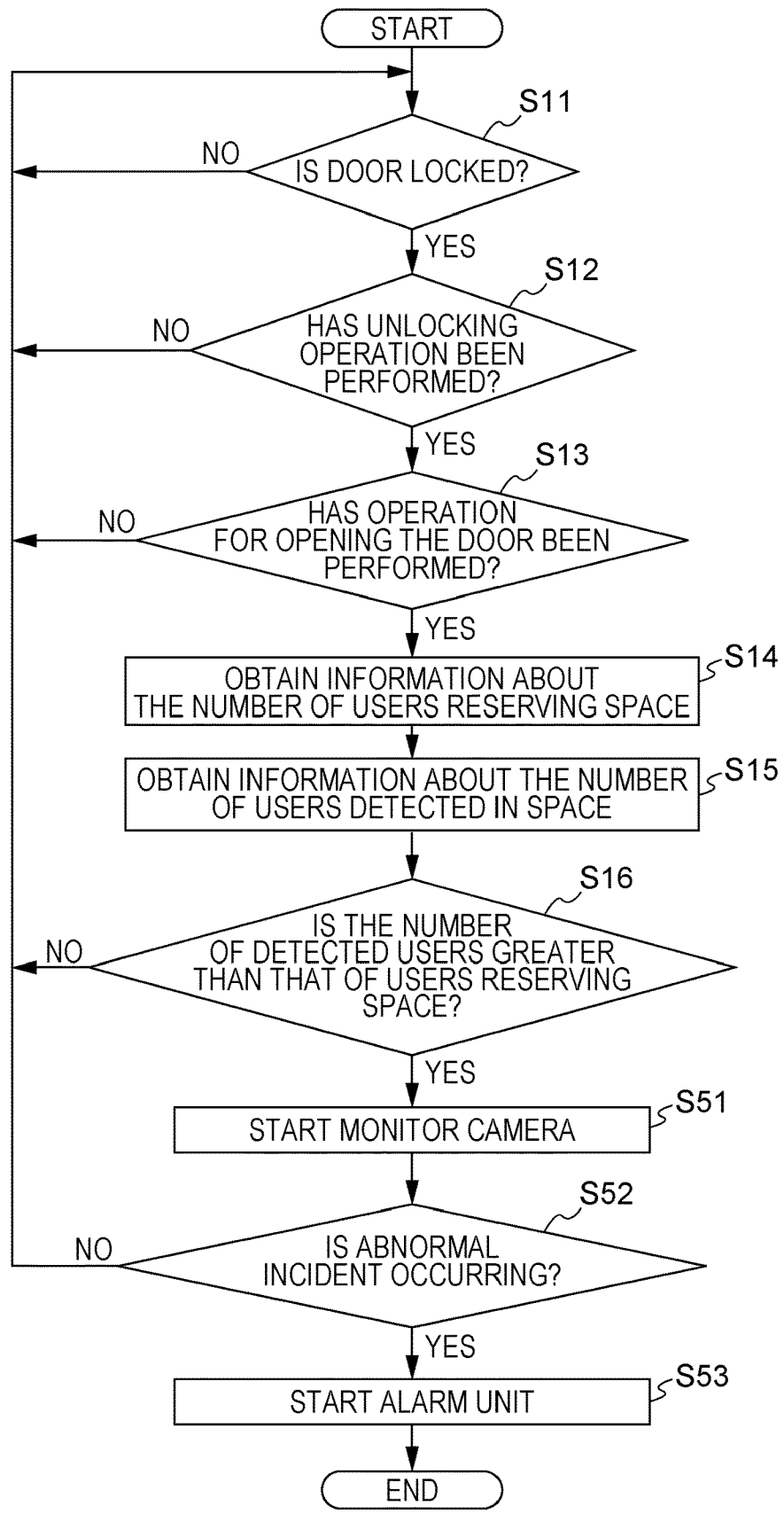

APPARATUS, MANAGEMENT SYSTEM, AND NON-TRANSITORY COMPUTER READABLE MEDIUM FOR ENTRANCE CONTROL

CROSS-REFERENCE TO RELATED APPLICATIONS

This application is based on and claims priority under 35 USC 119 from Japanese Patent Application No. 2017-207335 filed Oct. 26, 2017.

BACKGROUND

(i) Technical Field

The present invention relates to an apparatus, a management system, and a non-transitory computer readable medium.

(ii) Related Art

When being in a room with a door, a user is not aware of other people.

SUMMARY

According to an aspect of the invention, there is provided an apparatus including a controller. The controller performs control so as to set an entrance in a state in which the entrance is open if the number of people detected in a space is greater than the number of people reserving the space.

BRIEF DESCRIPTION OF THE DRAWINGS

Exemplary embodiments of the present invention will be described in detail based on the following figures, wherein:

FIG. 9 is a flowchart illustrating an example of a control operation executed by the opening-closing controller according to a second example;

FIG. 16 is a flowchart illustrating an example of a control operation executed by the opening-closing controller according to a fifth example;

DETAILED DESCRIPTION

Exemplary embodiments of the invention will be described below with reference to the accompanying drawings.

[Exemplary Embodiment]
[Overall Configuration of Management System]

Due to the increased communication speed and smaller communication terminals, users can now access various items of information even outside the office. On the other hand, however, business conversations and information are highly confidential, and quiet and high-security environments are desirably provided.

In this exemplary embodiment, a management system for providing spaces that satisfy such a demand will be described. Spaces, which will be described below, are not restricted for business use, but may also be for personal use.

Figure 1:
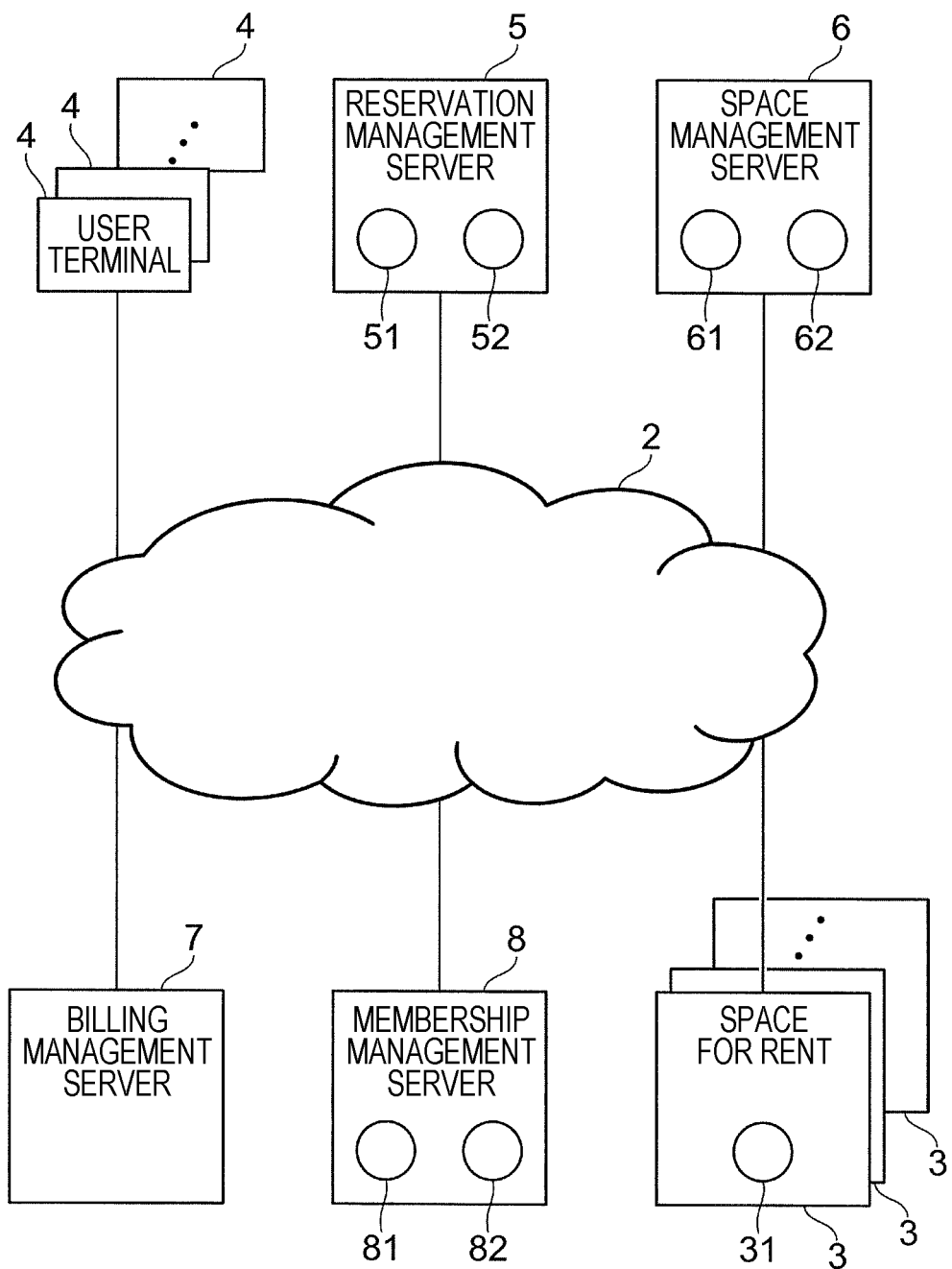
FIG. 1 schematically illustrates an example of the overall configuration of a management system.

FIG. 1 schematically illustrates an example of the overall configuration of a management system 1.

As shown in FIG. 1, the management system 1 is constituted by various terminals connected to a cloud network 2.

In the example in FIG. 1, the management system 1 includes multiple spaces 3 for rent, multiple user terminals 4, a reservation management server 5, a space management server 6, a billing management server 7, and a membership management server 8. The spaces 3 for rent are spaces to be rented on a time basis. Hereinafter, the spaces 3 for rent may simply be called the spaces 3. The user terminals 4 are carried by individual users using the spaces 3. The reservation management server 5 manages reservations for the spaces 3. The space management server 6 manages the usage statuses of the individual spaces 3. The billing management server 7 bills users for the use of the spaces 3. The membership management server 8 manages information concerning members entitled to use the spaces 3.

The spaces 3 are available twenty-four hours a day, seven days a week (24/7), except for the time reserved for maintenance, for example.

In the management system 1 shown in FIG. 1, one server is provided for one purpose (function). Alternatively, plural servers may be provided for one purpose (function). Conversely, one server may be provided for multiple purposes (functions).

Renting services for the spaces 3 may be provided by one business operator or plural business operators. For example, different business operators may separately conduct management concerning reservations, access to and usage statuses of the spaces 3, billing for the use of the spaces 3, and members registered as users. Alternatively, multiple business operators may conduct management concerning one purpose (function) collaboratively.

Plural servers may be provided for one purpose (function). If a single business operator provides plural servers for one purpose (function) or provides plural servers for multiple purposes (functions), the plural servers are connected to each other via an intranet.

The spaces 3 may be provided by a single business operator or plural business operators.

The management system 1 may be implemented as an aggregation of services provided by plural business operators.

In this exemplary embodiment, a digital key is used for locking and unlocking a space 3. A digital key is stored in a user terminal 4 or an integrated circuit (IC) card which supports near field communication (NFC) (not shown). If a user terminal 4 is used as a digital key, a digital key is provided from the reservation management server 5 to the user terminal 4 after a reservation is confirmed. If an IC card is used as a digital key, an IC card having a digital key recorded thereon is distributed from the reservation management server 5 to a user terminal 4 after a reservation is confirmed.

The use of a digital key makes it possible to freely determine an effective time period for which a space 3 can be locked and unlocked. Multiple digital keys for using one space 3 for the same time period may be issued.

Alternatively, multiple physical keys may be provided according to the reserved time to lock and unlock a space 3. User authentication may alternatively be conducted instead of the use of a key or as a function for supporting the use of a digital key or a physical key.

The reservation management server 5 manages a registration list 51 and a reservation list 52. In the registration list 51, vacancies for spaces 3 are registered. The reservation management server 5 manages the allocation of reservation holders to the spaces 3 by using the reservation list 52.

In this exemplary embodiment, the reservation management server 5 receives reservation requests for the spaces 3 24/7, except for the time reserved for maintenance, for example. The reservation management server 5 also issues digital keys to the user terminals 4 and conducts authentication if necessary. The space management server 6 may alternatively conduct authentication.

The space management server 6 manages information 61 concerning access to the individual spaces 3 and information 62 concerning the usage statuses of the individual spaces 3. The space management server 6 also serves the function of communicating with an authentication unit 32A (see FIG. 2) disposed in a space 3 to decide whether to permit a user to enter this space 3. When conducting authentication, the space management server 6 communicates with the reservation management server 5.

The space management server 6 also serves the function of collecting information from various devices 31 disposed in a space 3 and controlling the various devices 31.

The space management server 6 is connected to the cloud network 2 in FIG. 1. However, some or all of the functions of the space management server 6 may be integrated in a space 3.

The billing management server 7 serves the function of billing an individual member (may be a natural person (individual) or a legal person (enterprise)) based on reservation information, user information, information concerning access to a space 3. The billing management server 7 obtains reservation information from the reservation management server 5, information concerning access to a space 3 from the space management server 6, and membership information from the membership management server 8.

The membership management server 8 manages information concerning registered members and information concerning users. If a member is an individual person, the member is a user using a space 3. If a member is an enterprise, individual users are registered and managed according to the member.

Figure 2:
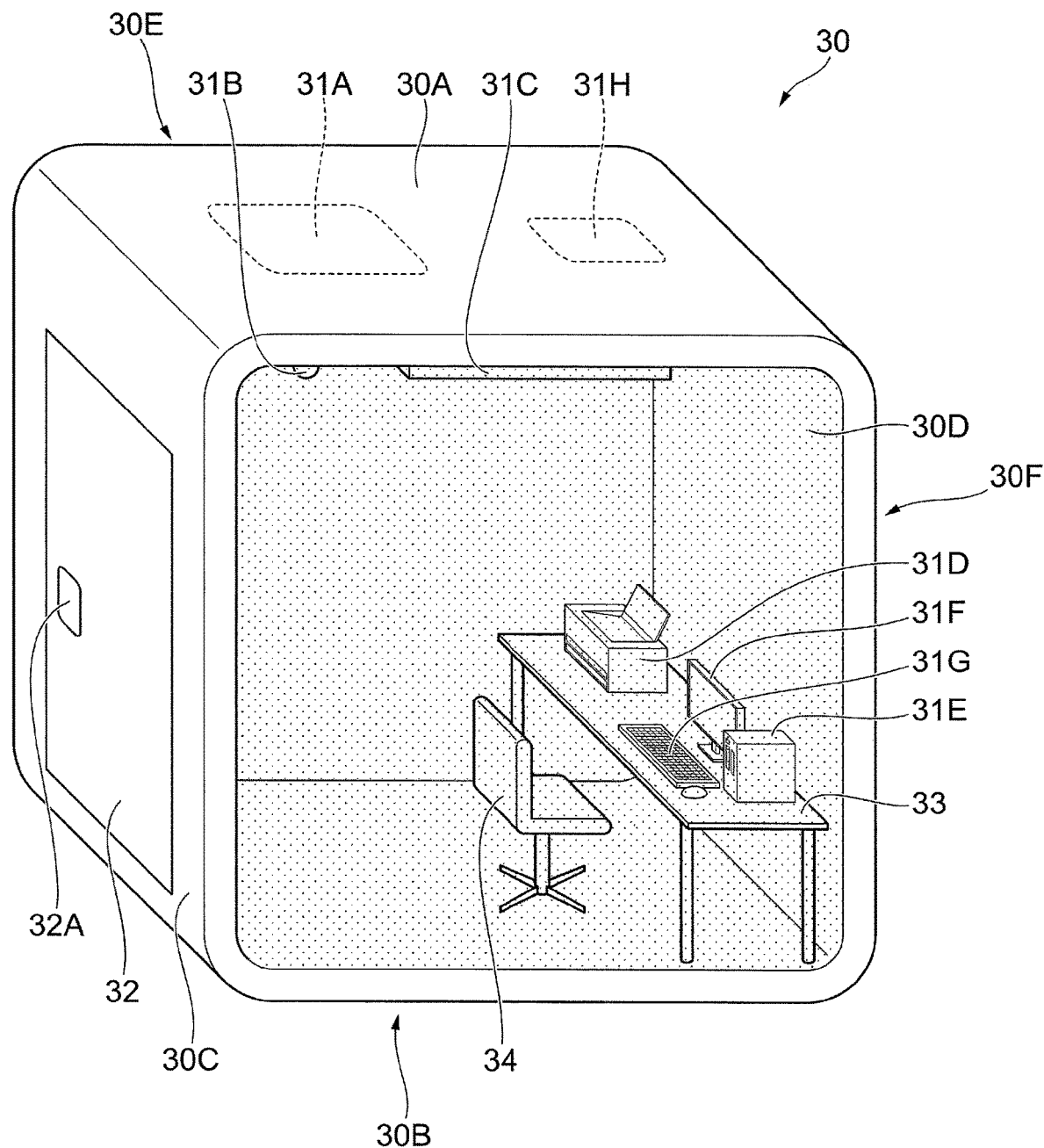
FIG. 2 is an external view of an example of the configuration of a space to be rented to a user.

FIG. 2 is an external view of an example of the configuration of a space 3 to be rented to a user.

In this exemplary embodiment, the spaces 3 are disposed indoors and outdoors, such as in station buildings, airports, office buildings, commercial complexes, for example, restaurants and department stores, banks, libraries, art galleries, museums, public institutions and facilities, passageways, and parks.

In this exemplary embodiment, a soundproof, small room is assumed as a space 3. In this sense, the space 3 is an example of a closed space. In this exemplary embodiment, however, "closed" does not mean "sealed", but is used in the sense of a space having a practical soundproof function. Openings and gaps, such as vent holes and small windows, may be provided in part of a skeleton 30 forming a space 3.

The skeleton 30 includes a ceiling 30A, a floor 30B, a wall 30C to which a door 32 is fixed, two walls 30D and 30E at both sides of the wall 30C, and a wall 30F opposite the door 32.

In this exemplary embodiment, a single hinged door is assumed as the door 32. In the single hinged door, a single door member is opened and closed such that it draws an arc. However, the door 32 may be a double hinged door having two door members.

The door 32 may be a sliding door. The sliding door may be a single sliding door in which one door member slides, a multiple sliding door set in which two or more door members slide in opposite directions on different rails, or a separate double sliding door set in which one door member slides to the left and the other door member slides to the right.

The door 32 may be a folding door in which a pair of door members connected by a hinge opens to fold back. The folding door has a single type which opens to one side and a double type which opens to two sides.

The door 32 may be a special door, such as a partition door or a pocket door which is withdrawn into a wall when it is not used.

The door 32 may be an inward opening type or an outward opening type.

In this exemplary embodiment, the walls 30D and 30E are partly constituted by a light-transmitting member, such as glass and acrylic resin, for example.

The structure, material, or processing to implement a blind function may be utilized for at least part of the walls 30D and 30E. The blind function makes it difficult to see the inside of the space 3 from the outside or to reduce the visibility through the walls 30D and 30E.

The material of the walls 30D and 30E may be a translucent member or a member with small scratches on its surface so as to cause light to scatter. A film-like member having a similar function may be attached to the walls 30D and 30E. The film-like member may be a liquid crystal film that can electrically switch between a transparent state and an opaque state or a polarizing film that can electrically control the luminous transmittance.

A structure or a member for a blind function may be provided separately. The walls 30D and 30E, as well as the other surfaces, may be made of a member that does not transmit light. Conversely, among the elements forming the skeleton 30, three or more surfaces may be made of a transparent or translucent member.

The number of users using a space 3 is largely determined by the volume of this space 3. Basically, in this exemplary embodiment, a private room for one person is assumed as a space 3. However, the space 3 may be a large room for accommodating a large group of people. A large room may be formed as one room, or it may be formed by interconnecting spaces 3 by removing one of or both of the walls 30D and 30E of each space 3.

A private room is not necessarily for only one person, and may be used for a few people, such as two or three people.

The configuration and structure of the skeleton 30 forming an individual space 3, and facilities to be provided by the space 3 and their performance may be determined as desired.

In this exemplary embodiment, one desk 33 and one chair 34 are disposed within the skeleton 30. On the desk 33, a printer 31D, a computer 31E, a display device 31F, and an input device 31G, which are examples of the devices 31, are placed. To protect user information, data and history information stored in the computer 31E are all deleted under the control of the system after the use of the space 3.

As the other devices 31, an air conditioner 31A, a human sensor 31B, a lighting fixture 31C used as indoor illumination, a control device 31H, and an authentication unit 32A are fixed. The control device 31H controls the operation of electronic devices including the devices 31.

The devices 31 are only examples of electronic devices. The printer 31D, the computer 31E, the display device 31F, and the input device 31G on the desk 33 may not necessarily be provided. In this case, a user uses its own computer or smartphone.

The entirety of the space 3 (including the skeleton 30) or the control device 31H is an example of an apparatus. The control device 31H is also an example of a controller.

Each of the user terminal 4, the reservation management server 5, the space management server 6, the billing management server 7, and the membership management server 8 is also an example of the apparatus.

The management system 1 is an example of a management system.

[Configuration of Terminal]

Examples of the configurations of the terminals forming the management system 1 will be discussed below with reference to FIGS. 3 through 5.

Figure 3:
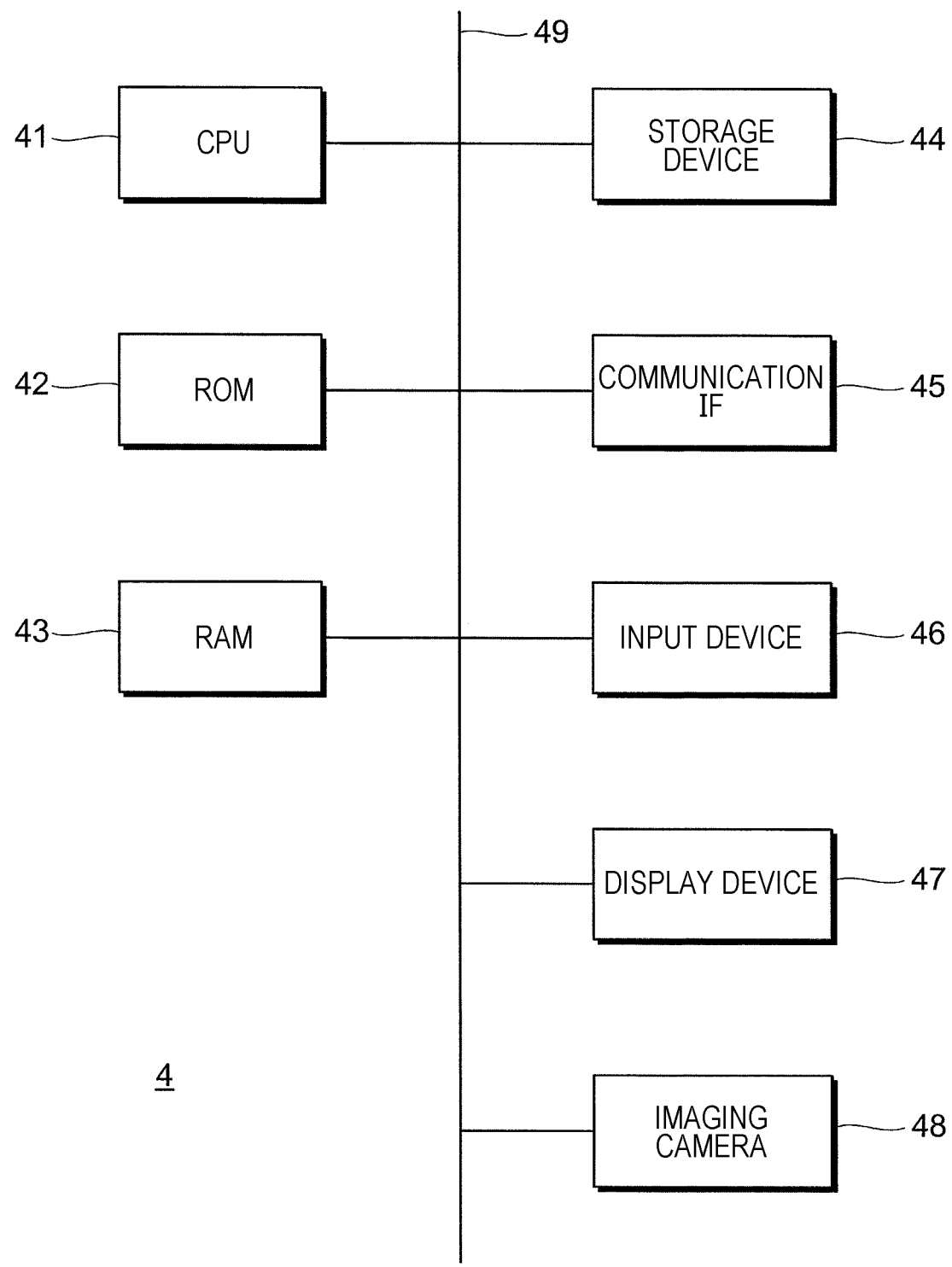
FIG. 3 is a block diagram illustrating an example of the hardware configuration of a user terminal.

FIG. 3 is a block diagram illustrating an example of the hardware configuration of the user terminal 4.

In this exemplary embodiment, a smartphone is used as the user terminal 4.

The user terminal 4 includes a central processing unit (CPU) 41, a read only memory (ROM) 42, and a random access memory (RAM) 43. The CPU 41 provides various functions by executing firmware and application programs. The ROM 42 is a storage area in which firmware and basic input output system (BIOS) are stored. The RAM 43 is an area where a program is executed.

The user terminal 4 also includes a volatile storage device 44, a communication interface 45 (communication IF), an input device 46, such as a touchscreen, a display device 47, and an imaging camera 48. The storage device 44, which is a semiconductor memory, for example, stores downloaded application programs and a digital key, for example. The communication IF 45 is used for communicating with external devices. The display device 47 is used for displaying information.

The CPU 41 is connected to the devices forming the user terminal 4 via a bus 49.

Figure 4:
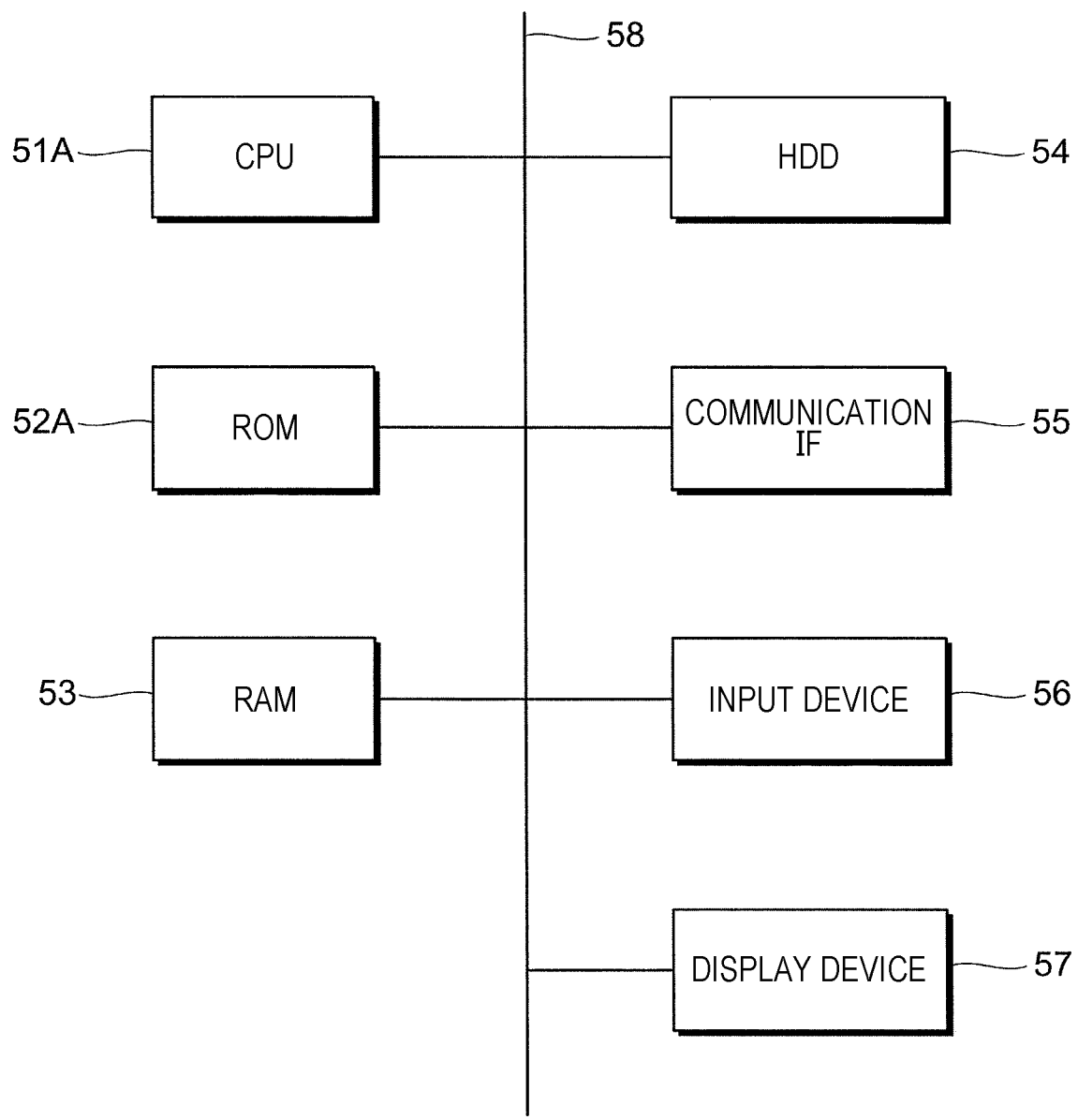
FIG. 4 is a block diagram illustrating an example of the hardware configuration of a server forming the management system.

FIG. 4 is a block diagram illustrating an example of the hardware configuration of a server forming the management system 1.

The configuration of the reservation management server 5 is shown in FIG. 4 as a typical example of the server. The configurations of the other servers, that is, the space management server 6, the billing management server 7, and the membership management server 8, are similar to the configuration of the reservation management server 5.

The reservation management server 5 includes a CPU 51A, a ROM 52A, and a RAM 53. The CPU 51A provides various management functions by executing an operating system (OS) and application programs. The ROM 52A is a storage area in which an OS and a BIOS are stored. The RAM 53 is an area where a program is executed.

The reservation management server 5 also includes a volatile hard disk drive (HDD) 54, a communication IF 55, an input device 56, such as a keyboard, and a display device 57. The HDD 54 stores application programs and various items of management data for implementing the associated management functions. The communication IF 55 is used for communicating with external devices. The display device 57 is used for displaying information.

The CPU 51A is connected to the devices via a bus 58.

Each server is an example of a database for storing management data.

Figure 5:
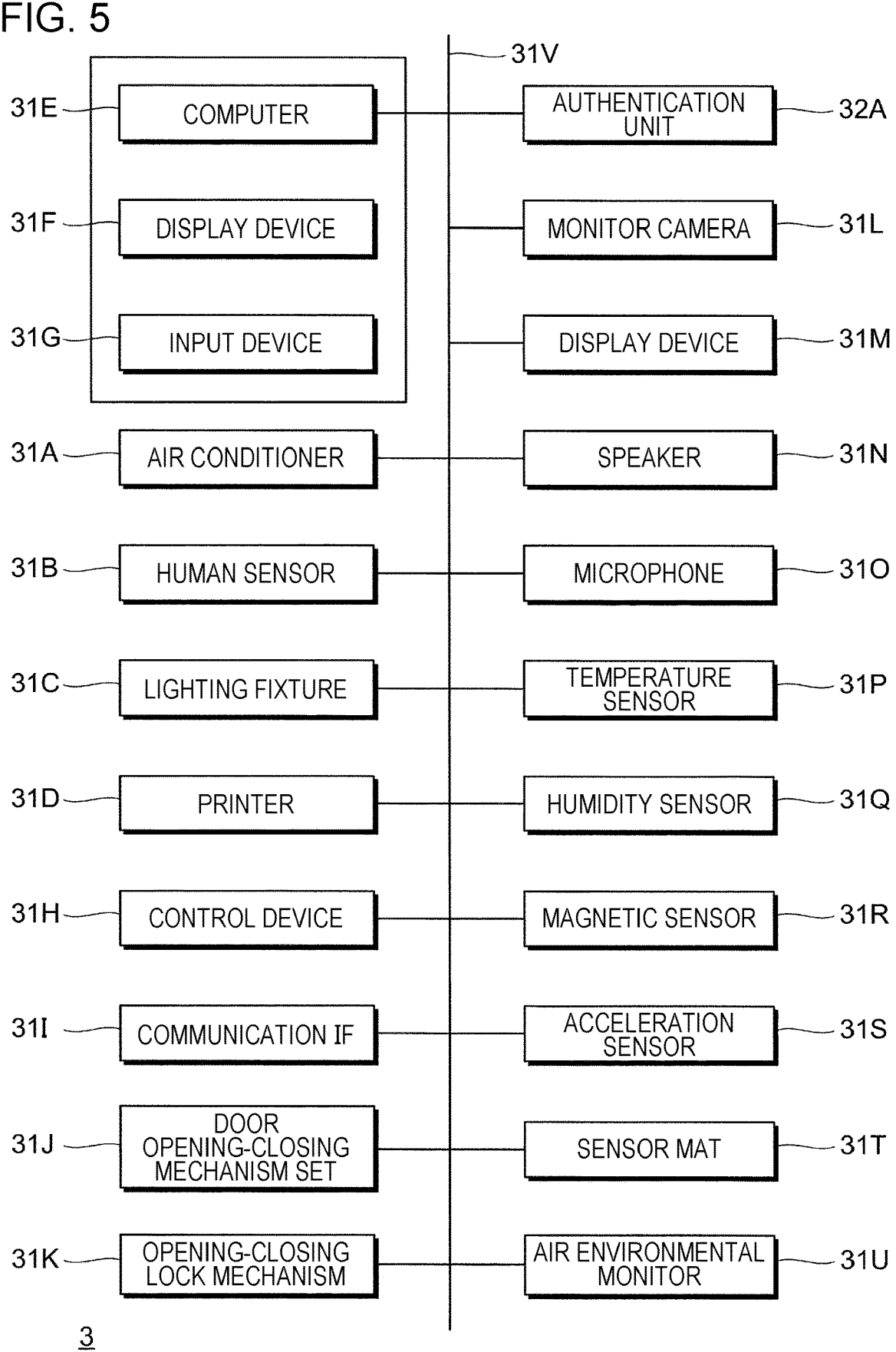
FIG. 5 is a block diagram illustrating an example of the configuration of a space which forms the management system.

FIG. 5 is a block diagram illustrating an example of the configuration of a space 3 which forms the management system 1.

The space 3 includes an air conditioner 31A, a human sensor 31B, a lighting fixture 31C, a printer 31D, a computer 31E, a display device 31F, an input device 31G, a control device 31H, and an authentication unit 32A.

The air conditioner 31A is used for adjusting the temperature and humidity within the space 3 (room). A mechanism specially used for ventilation may be provided, together with or separately from the air conditioner 31A.

The human sensor 31B is a sensor for detecting people within the space 3. As the human sensor 31B, various types of sensors, such as a pyroelectric infrared human sensor that can detect the motion of people, and an image human sensor and a thermopile human sensor that can detect the number and position of people, are available. One or plural of these types of sensors are used according to the purpose of use.

The printer 31D, the computer 31E, the display device 31F, and the input device 31G are examples of information devices installed in the room for a user to operate. These information devices are connected to each other via a local area network (LAN) 31V, such as a LAN cable or a wireless LAN. If a user brings its own computer, the computer is connected to the LAN 31V. As the wireless LAN, WiFi (registered trademark) or Bluetooth (registered trademark) is used.

The control device 31H is a control computer that collects information from the devices 31 connected to the LAN 31V and also controls the operations of the individual devices 31. In some management systems 1, the control device 31H provides the functions of the space management server 6.

The authentication unit 32A is fixed to the door 32 of the space 3, for example. The authentication unit 32A is used for obtaining and sending and receiving information required for locking and unlocking the door 32. Authentication is conducted in the reservation management server 5, and an authentication result is only supplied to the authentication unit 32A. When authentication has succeeded, the authentication unit 32A unlocks the door 32. After unlocking the door 32, a user can open and close the door 32 to enter the space 3 (see FIG. 2).

The space 3 also includes a communication IF 311 for communicating with external devices. The communication IF 311 is connected to the cloud network 2 (see FIG. 1) to communicate with various servers.

The space 3 also includes a door opening-closing mechanism set 31J for mechanically controlling the opening and closing of the door 32. The door opening-closing mechanism set 31J includes a mechanism for driving the door 32 to open and close and a mechanism for adjusting the magnitude of a load required for a user to open and close the door 32.

The space 3 also includes an opening-closing lock mechanism 31K. The opening-closing lock mechanism 31K temporarily stops the opening and closing of the door 32. While the opening-closing lock mechanism 31K is in operation, at least the operation of closing the door 32 is temporarily stopped.

The space 3 also includes a monitor camera 31L for monitoring the motion of users indoors and outdoors. However, the monitor camera 31L may not necessarily be provided.

The space 3 also includes a display device 31M. In this exemplary embodiment, the display device 31M is disposed on the external side of the wall 30C to which the door 32 is fixed, and is used for a user to operate when entering the space 3 and also for providing information. The display device 31M is also used for a user using the space 3 and also for providing information.

The space 3 also includes a speaker 31N. The speaker 31N is used for supplying information to a user indoors and to people outdoors. The speaker 31N is an example of an informing unit and also an example of an alarm unit.

The space 3 also includes a microphone 31O. The microphone 31O is used for collecting indoor sound.

The space 3 also includes a temperature sensor 31P. The temperature sensor 31P is used for measuring the indoor temperature.

The space 3 also includes a humidity sensor 31Q. The humidity sensor 31Q is used for measuring the indoor humidity.

The space 3 also includes a magnetic sensor 31R. The magnetic sensor 31R is attached to the door 32 to detect the opening or closing of the door 32 by sensing a magnetic force.

The space 3 also includes an acceleration sensor 31S. The acceleration sensor 31S is used for detecting the motion of an object.

The space 3 also includes a sensor mat 31T. The sensor mat 31T detects the weight of an object to visualize the time period for which a user has stayed in the space 3 or the congestion status of the space 3.

The space 3 also includes an air environmental monitor 31U. The air environmental monitor 31U, which detects constituents contained in air in the space 3, measures concentrations of PM2.5 and PM10, carbon dioxide, and volatile organic compounds. The air environmental monitor 31U may also measure the temperature and the humidity. The air environmental monitor 31U may not necessarily measure all of the above-described constituents or may measure other constituents. If the air environmental monitor 31U measures the temperature and the humidity, the provision of the temperature sensor 31P and the humidity sensor 31Q may be omitted.

[Control Function]

A control function implemented by one of the terminals forming the management system 1 (see FIG. 1) or by collaborative work of some of the terminals will be discussed below with reference to FIG. 6.

A description will be given of a case in which the control function is implemented by the control device 31H alone.

Figure 6:
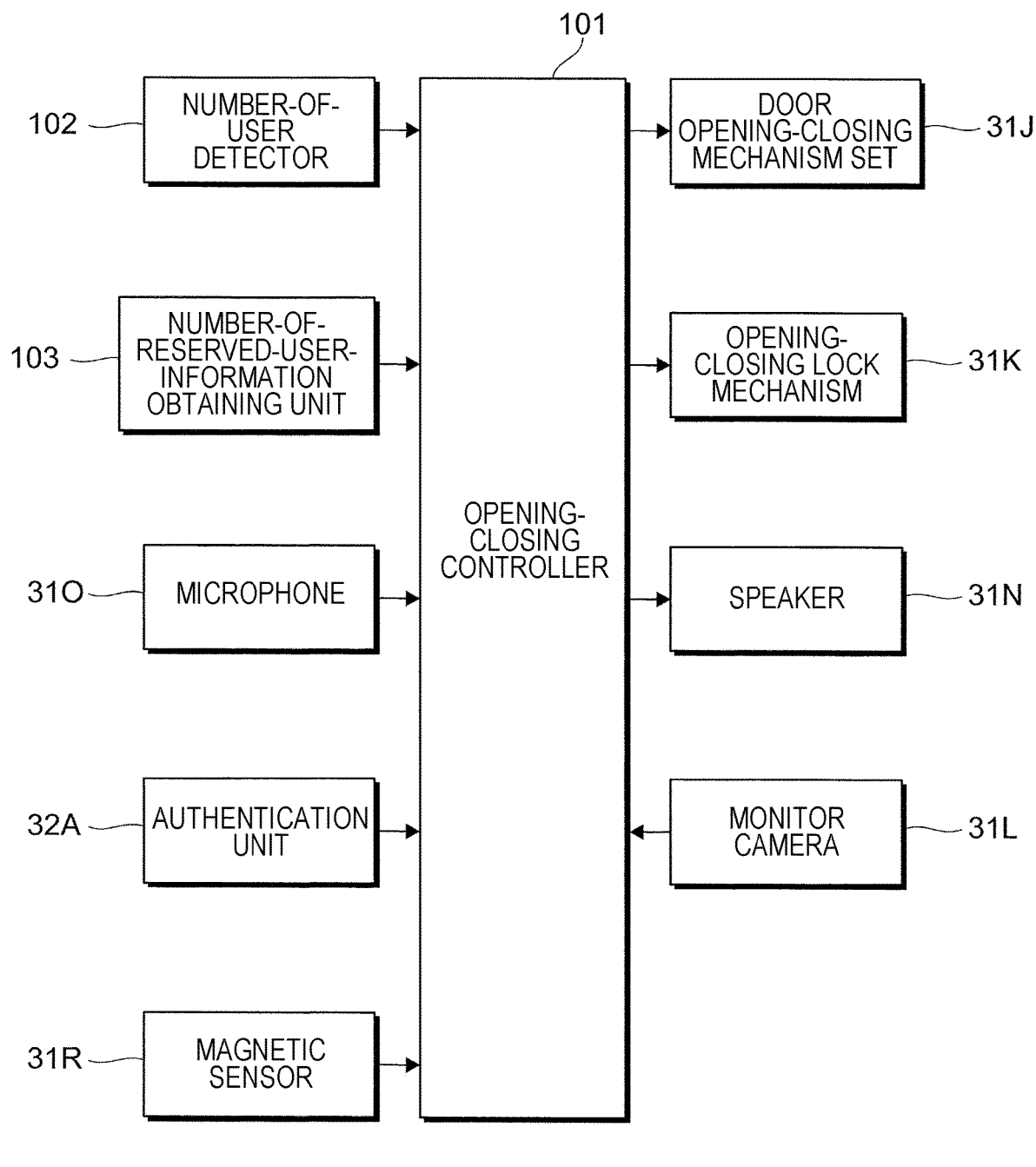
FIG. 6 is a block diagram illustrating an example of the software configuration of a control device.

FIG. 6 is a block diagram illustrating an example of the software configuration of the control device 31H.

The control device 31H implements the corresponding functions by executing a program.

The control device 31H includes an opening-closing controller 101, a number-of-user detector 102, and a number-of-reserved-user-information obtaining unit 103. The opening-closing controller 101 controls the opening and closing of the door 32 (see FIG. 2). The number-of-user detector 102 detects the number of users within a space 3 by using output from the human sensor 31B or the sensor mat 31T, for example. The number-of-reserved-user-information obtaining unit 103 obtains information about the number of users currently reserving a space 3 by communicating with the reservation management server 5.

The opening-closing controller 101 compares the number of users detected within a space 3 and the number of users reserving this space 3. If the number of detected users is found to be greater than the number of users reserving the space 3, the opening-closing controller 101 performs control so as to set the door 32 in a state in which it is open. More specifically, by using the door opening-closing mechanism set 31J, the opening-closing lock mechanism 31K, and the authentication unit 32A, the opening-closing controller 101 controls an unlocking operation of the door 32 or in which manner the door 32 is opened. Specific examples of the control operation will be discussed later.

During the process of this control operation, the opening-closing controller 101 also uses output from the magnetic sensor 31R and imaging data output from the monitor camera 31L.

If necessary, the opening-closing controller 101 causes the speaker 31N to output sound collected by the microphone 31O.

[Examples of Control Operation]

Examples of the control operation implemented under the control of the opening-closing controller 101 (see FIG. 6) will be described below.

First Example

A first example of the control operation executed by the opening-closing controller 101 will be discussed below with reference to FIGS. 7 through 8C.

Figure 7:
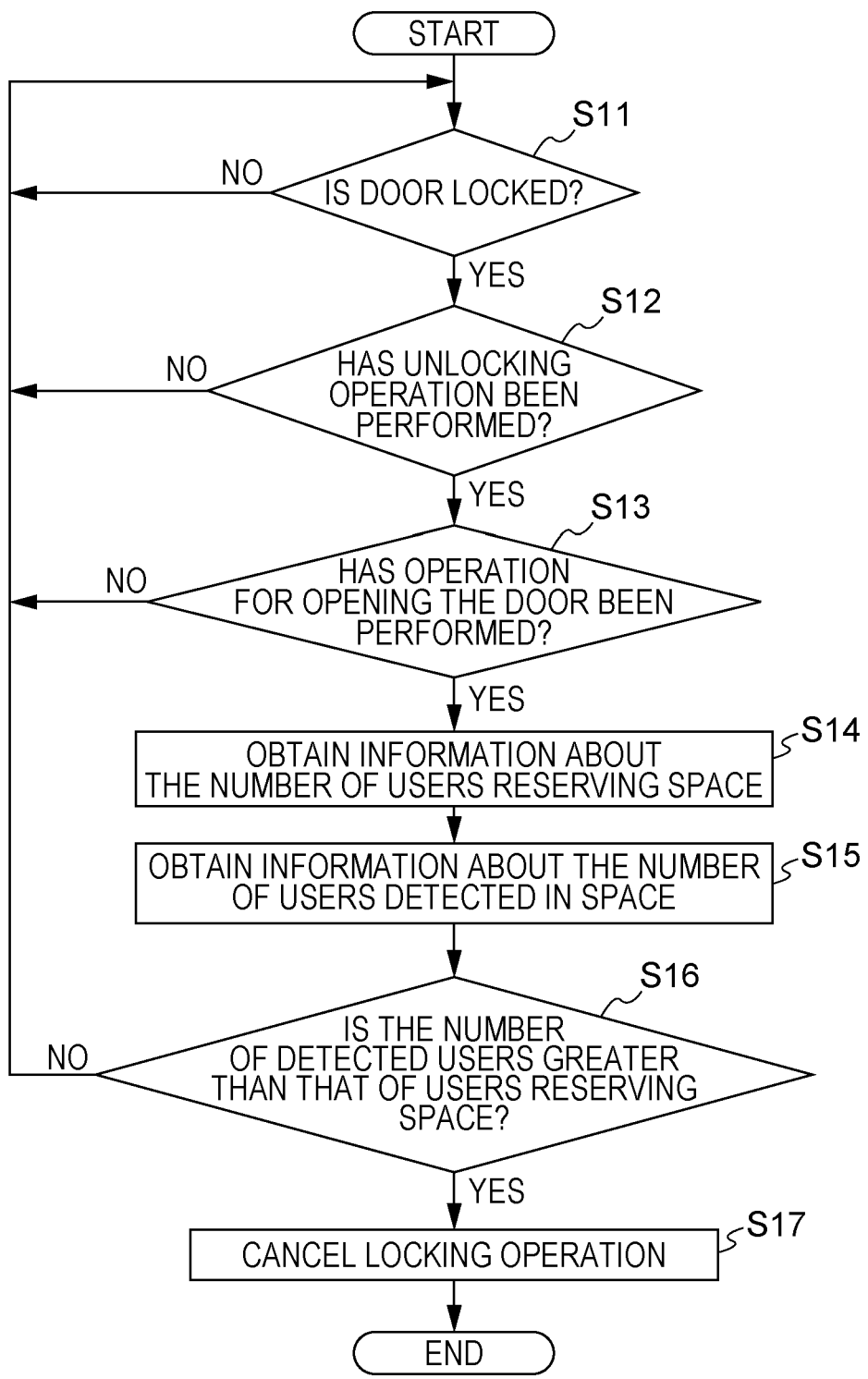
FIG. 7 is a flowchart illustrating an example of a control operation executed by an opening-closing controller according to a first example.

FIG. 7 is a flowchart illustrating an example of the control operation executed by the opening-closing controller 101 according to the first example.

Figure 8A:
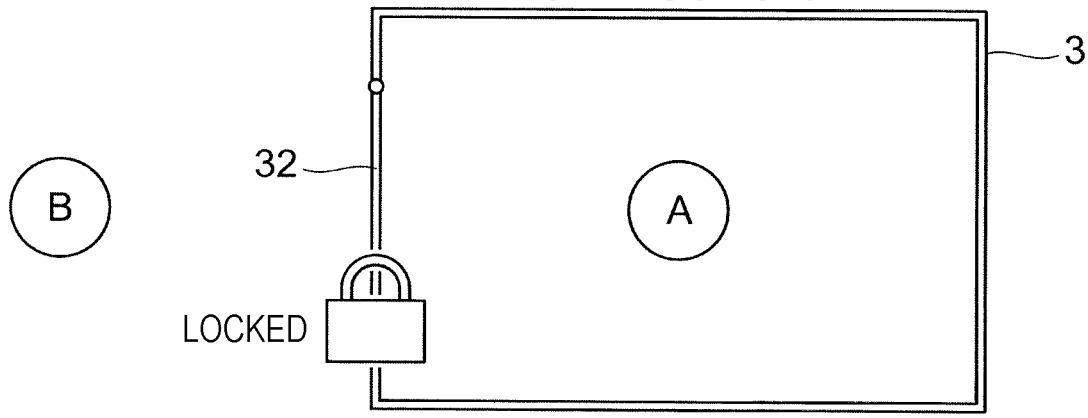
FIGS. 8A through 8C illustrate a process of a control operation according to the first example.
Figure 8B:
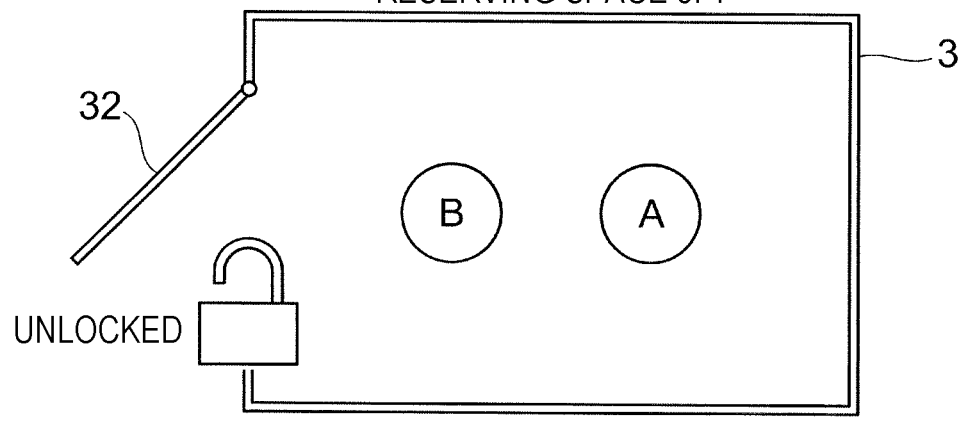
Figure 8C:
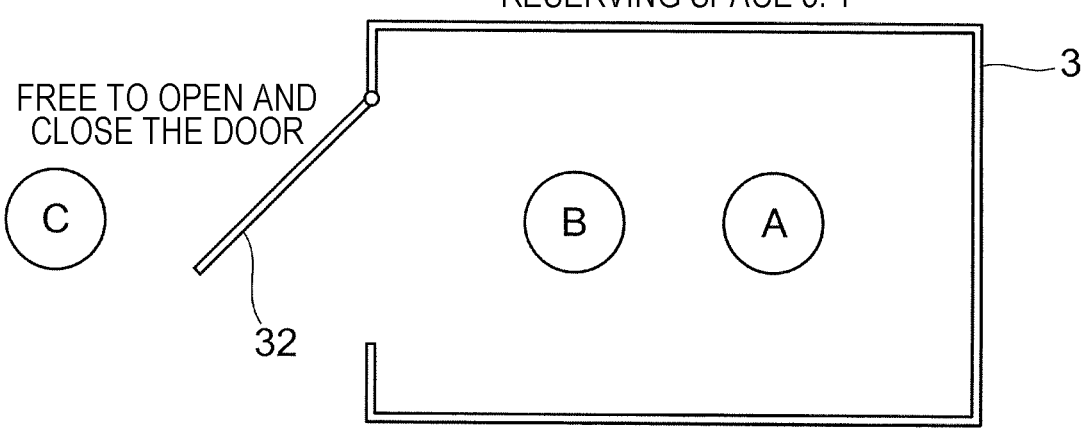

FIGS. 8A through 8C illustrate a process of the control operation. FIG. 8A shows a state in which only user A is in a space 3. FIG. 8B shows a state in which user B has entered the space 3 by unlocking the door 32. FIG. 8C shows an example of the control operation for canceling a locking operation.

Referring back to FIG. 7, the opening-closing controller 101 judges in step S11 whether the door 32 is locked. The opening-closing controller 101 executes step S11 regardless of whether a user is within a space 3. There may be a case in which the user leaves the space 3 for eating or going to the bathroom during a reserved time period.

While the result of step S11 is NO, the opening-closing controller 101 repeats step S11.

If the result of step S11 is YES, the opening-closing controller 101 judges in step S12 whether an unlocking operation has been performed. The opening-closing controller 101 executes step S12 regardless of whether a user is within the space 3. In this case, the unlocking operation may be either the operation performed from inside the space 3 or that from outside the space 3.

If the result of step S12 is NO, the opening-closing controller 101 returns to step S11.

If the result of step S12 is YES, the opening-closing controller 101 judges in step S13 whether an operation for opening the door 32 has been performed. The operation for opening the door 32 may be either the operation performed from inside the space 3 or that from outside the space 3.

In the state in FIG. 8A, the door 32 is closed and locked. User A is inside the space 3 and user B is outside the space 3. In one example of such a case, the reservation time of user A has already passed, but user A is not ready to leave the space 3, and then, user B, the next person reserving the space 3, has arrived. In another example, when user A is going out by unlocking the door 32, user B, a passerby, happens to be outside the space 3.

If the result of step S13 is NO, there is no chance that user A and user B will face each other. The opening-closing controller 101 thus returns to step S11.

If the result of step S13 is YES, the opening-closing controller 101 obtains information about the number of users reserving the space 3 in step S14. The opening-closing controller then obtains information about the number of users detected in the space 3 in step S15.

In the example in FIG. 7, obtaining information about the number of users reserving the space 3 in step S14 is executed after the operation for opening the door 32 in step S13. However, step S14 may be executed before step S13. For example, step S14 may be executed when user A is found to enter the space 3 or when the reservation time has started.

In the example in FIG. 7, obtaining information about the number of detected users in step S15 is executed after steps S13 and S14. However, step S15 may be executed at another time. For example, the number of users within a space 3 may constantly be monitored and detected.

FIG. 8B shows a state in which user A and user B are inside the space 3 after the door 32 is opened. In this case, it does not matter which one of user A and user B has unlocked the door 32.

Then, the opening-closing controller 101 judges in step S16 whether the number of detected users is greater than that of users reserving the space 3. The opening-closing controller 101 desirably makes this judgement repeatedly until a predetermined time elapses after the operation for opening the door 32 has been found.

If the result of step S16 is NO, only user A or user B is inside the space 3, and the opening-closing controller 101 returns to step S11.

If the result of step S16 is YES, the opening-closing controller 101 performs control in step S17 so as to cancel a locking operation. In this case, the space 3 is being used under unforeseen circumstances, unlike it has been intended. This does not necessarily mean that user A and user B are having trouble with each other. For example, user B may simply be a colleague or a friend of user A and may have entered the space 3 together with user A.

However, entering of a colleague or a friend in the space 3 is still using of the space 3 under unforeseen circumstances.

In the first example, the opening-closing controller 101 performs control so as to cancel a locking operation. In this manner, the soundproof function, which is one of the functions of the space 3, is not implemented. Even if a user tries to lock the door 32, the locking operation is canceled, so that the door 32 is maintained at a state in which it can be opened from indoors and outdoors. This may be effective in stopping user A and user B from using the space 3 in an unforeseen situation because anyone can enter the space 3. For example, user A and user B may be seen by a passerby, such as user C, as shown in FIG. 8C.

As the traffic is heavier in a place where the space 3 is located, it is more effective in stopping user A and user B from using the space 3 in an unforeseen situation.

In the example in FIGS. 8A through 8C, user A is already within the space 3 before user B enters the space 3. The control function is still applicable when user B enters the space 3 together with user A.

Second Example

A second example of the control operation executed by the opening-closing controller 101 will be discussed below with reference to FIGS. 9 through 11.

FIG. 9 is a flowchart illustrating an example of the control operation executed by the opening-closing controller 101 according to the second example. In FIG. 9, steps corresponding to those shown in FIG. 7 are designated by like step numbers. FIG. 10 illustrates an example in which the door 32 is maintained at a position at which it is open. FIG. 11 illustrates another example in which the door 32 is maintained at a position at which it is open.

As in the first example, the opening-closing controller 101 first judges in step S11 whether the door 32 is locked.

While the result of step S11 is NO, the opening-closing controller 101 repeats step S11.

If the result of step S11 is YES, the opening-closing controller 101 judges in step S12 whether an unlocking operation has been performed. If the result of step S12 is NO, the opening-closing controller 101 returns to step S11.

If the result of step S12 is YES, the opening-closing controller 101 judges in step S13 whether an operation for opening the door 32 has been performed.

If the result of step S13 is NO, the opening-closing controller 101 returns to step S11.

If the result of step S13 is YES, the opening-closing controller 101 obtains information about the number of users reserving the space 3 in step S14, and obtains information about the number of users detected in the space 3 in step S15.

Then, the opening-closing controller 101 judges in step S16 whether the number of detected users is greater than that of users reserving the space 3.

If the result of step S16 is NO, the opening-closing controller 101 returns to step S11.

The above-described operations are the same as those in the first example.

If the result of step S16 is YES, the process proceeds to step S21. In step S21, the opening-closing controller 101 performs control so as to maintain the door 32 at a position at which it is open.

Figure 10:
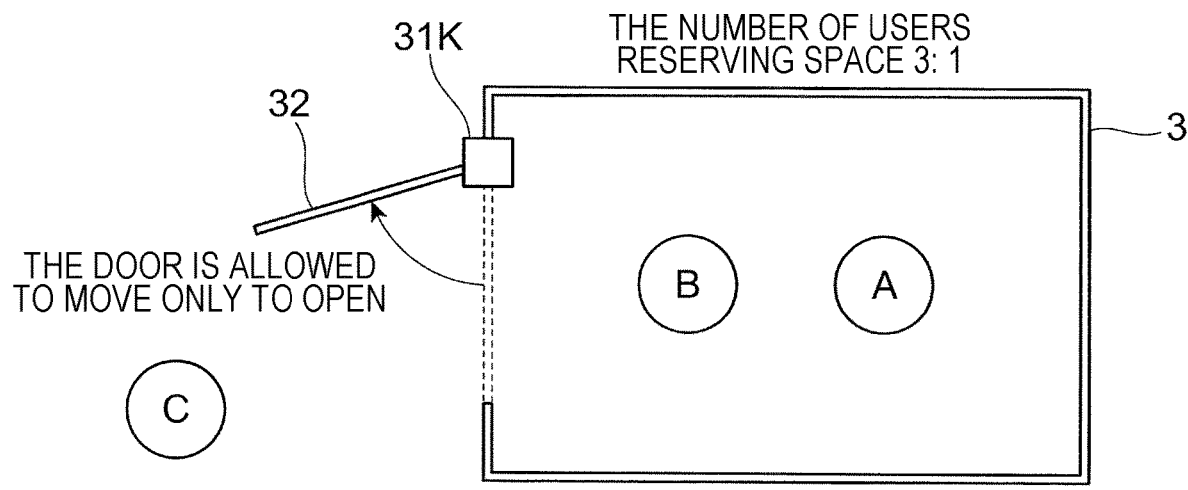
FIG. 10 illustrates an example in which a door is maintained at a position at which it is open.

In the example in FIG. 10, the opening-closing lock mechanism 31K stops the door 32 from moving to close even if user A or user B tries to close the door 32. On the other hand, user A and user B are allowed to open the door 32. In other words, the door 32 is allowed to move only in a direction in which the opening area of the space 3 is increased. The door 32 is not closed, and as the opening area of the space 3 is greater, it is easier to check the state inside the space 3 from outside. This may be effective in stopping user A and user B from using the space 3 in an unforeseen situation. For example, user A and user B are more likely to be seen by a passerby, such as user C, as shown in FIG. 10.

Figure 11:
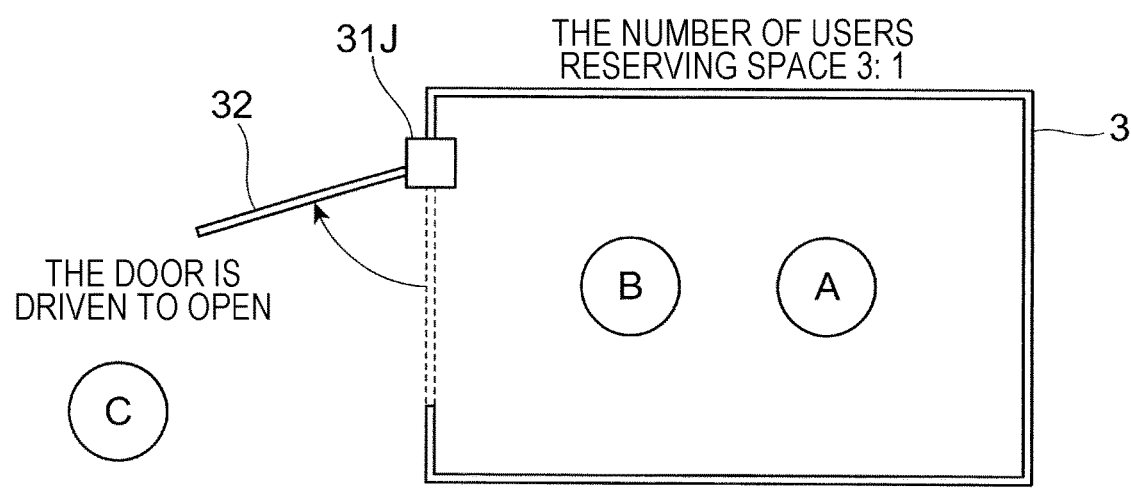
FIG. 11 illustrates another example in which a door is maintained at a position at which it is open.

In the example in FIG. 11, the opening-closing lock mechanism 31K drives the door 32 to open regardless of whether user A or user B intends to do so. In other words, the door 32 is driven so that the opening area of the space 3 will become greater than that when the number of detected users has been found to be greater than that of users reserving the space 3 in step S16. In the example in FIG. 11, the door 32 is forced to open. This may be more effective in stopping user A and user B from using the space 3 in an unforeseen situation. For example, user A and user B are more likely to be seen by a passerby, such as user C, as shown in FIG. 11.

Third Example

A third example of the control operation executed by the opening-closing controller 101 will be discussed below with reference to FIGS. 12 and 13.

Figure 12:
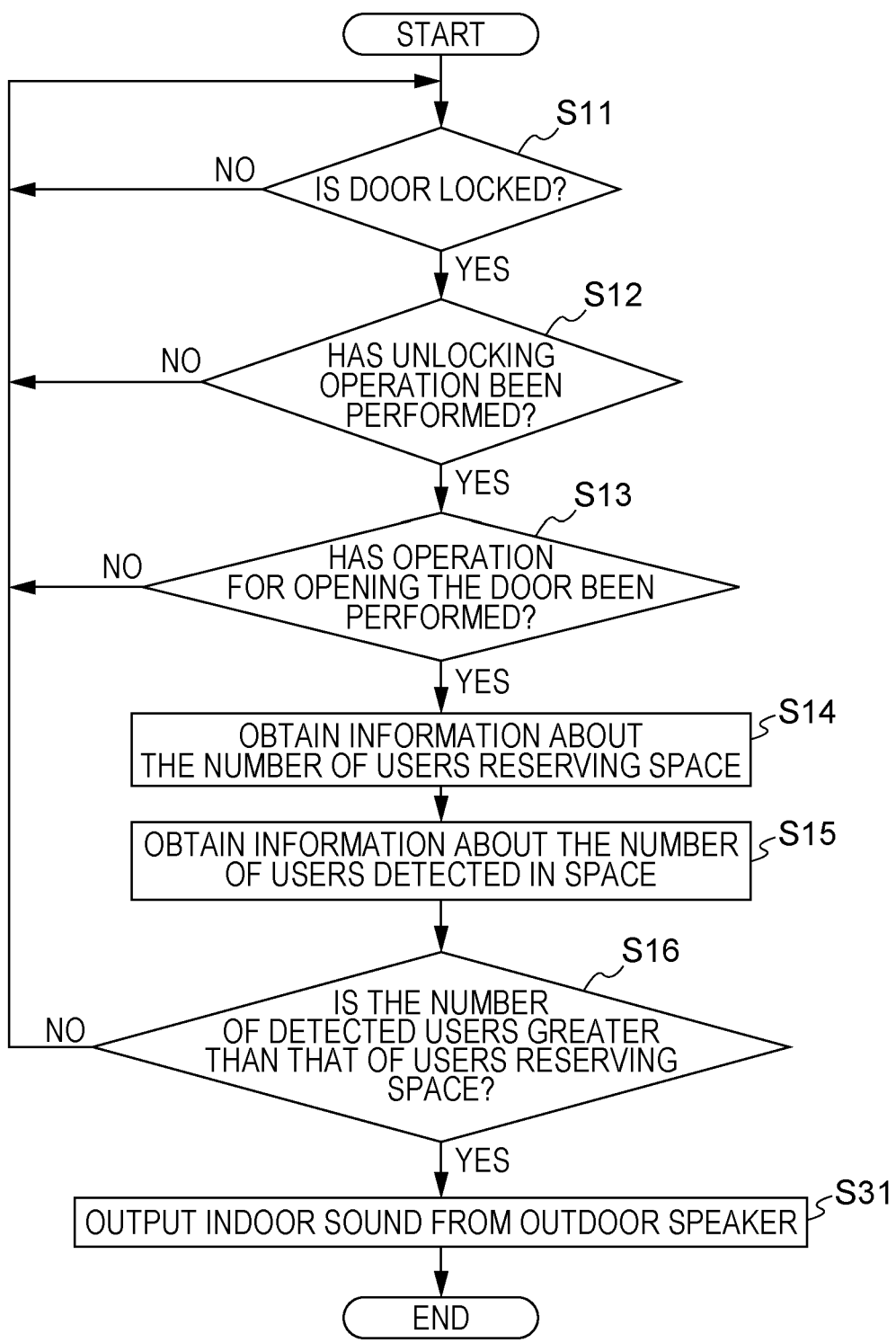
FIG. 12 is a flowchart illustrating an example of a control operation executed by the opening-closing controller according to a third example.

FIG. 12 is a flowchart illustrating an example of the control operation executed by the opening-closing controller 101 according to the third example. In FIG. 12, steps corresponding to those shown in FIG. 7 are designated by like step numbers. FIG. 13 illustrates a state in which indoor sound is output from the outdoor speaker 31N to the outside.

As in the first example, the opening-closing controller 101 first judges in step S11 whether the door 32 is locked.

While the result of step S11 is NO, the opening-closing controller 101 repeats step S11.

If the result of step S11 is YES, the opening-closing controller 101 judges in step S12 whether an unlocking operation has been performed. If the result of step S12 is NO, the opening-closing controller 101 returns to step S11.

If the result of step S12 is YES, the opening-closing controller 101 judges in step S13 whether an operation for opening the door 32 has been performed.

If the result of step S13 is NO, the opening-closing controller 101 returns to step S11.

If the result of step S13 is YES, the opening-closing controller 101 obtains information about the number of users reserving the space 3 in step S14, and obtains information about the number of users detected in the space 3 in step S15.

Then, the opening-closing controller 101 judges in step S16 whether the number of detected users is greater than that of users reserving the space 3.

If the result of step S16 is NO, the opening-closing controller 101 returns to step S11.

The above-described operations are the same as those in the first example.

If the result of step S16 is YES, the opening-closing controller 101 performs control in step S31 so as to output indoor sound from the outdoor speaker 31N to the outside.

Figure 13:
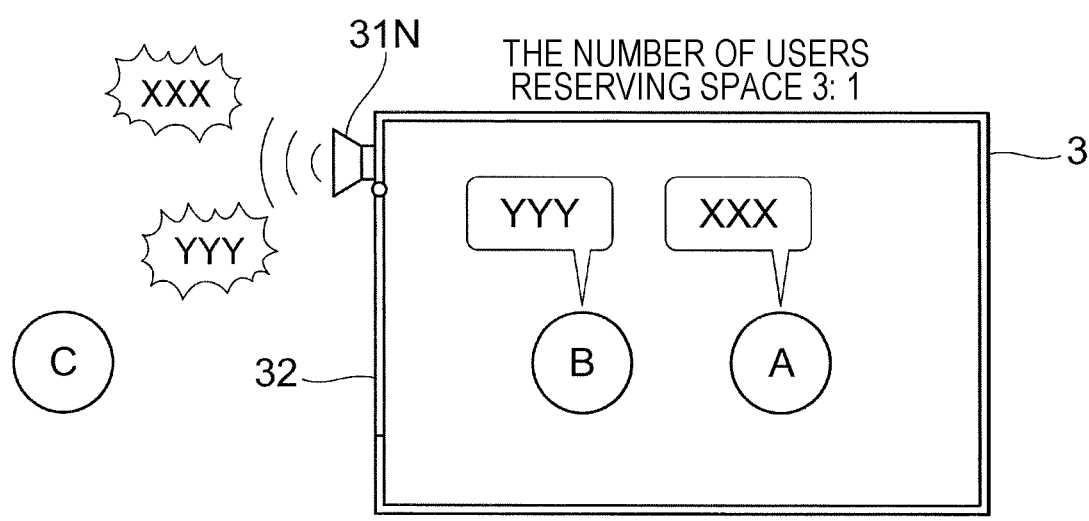
FIG. 13 illustrates a state in which indoor sound is output from an outdoor speaker to the outside.

FIG. 13 shows a state in which voice "XXX" uttered by user A and voice "YYY" uttered by user B are being output from the outdoor speaker 31N. In this state, the space 3 is not totally a closed space. Outputting indoor sound from the outdoor speaker 31N is not favorable for user A and user B, and may be more effective in stopping them from using the space 3 in an unforeseen situation.

Fourth Example

A fourth example of the control operation executed by the opening-closing controller 101 will be discussed below with reference to FIGS. 14 and 15.

Figure 14:
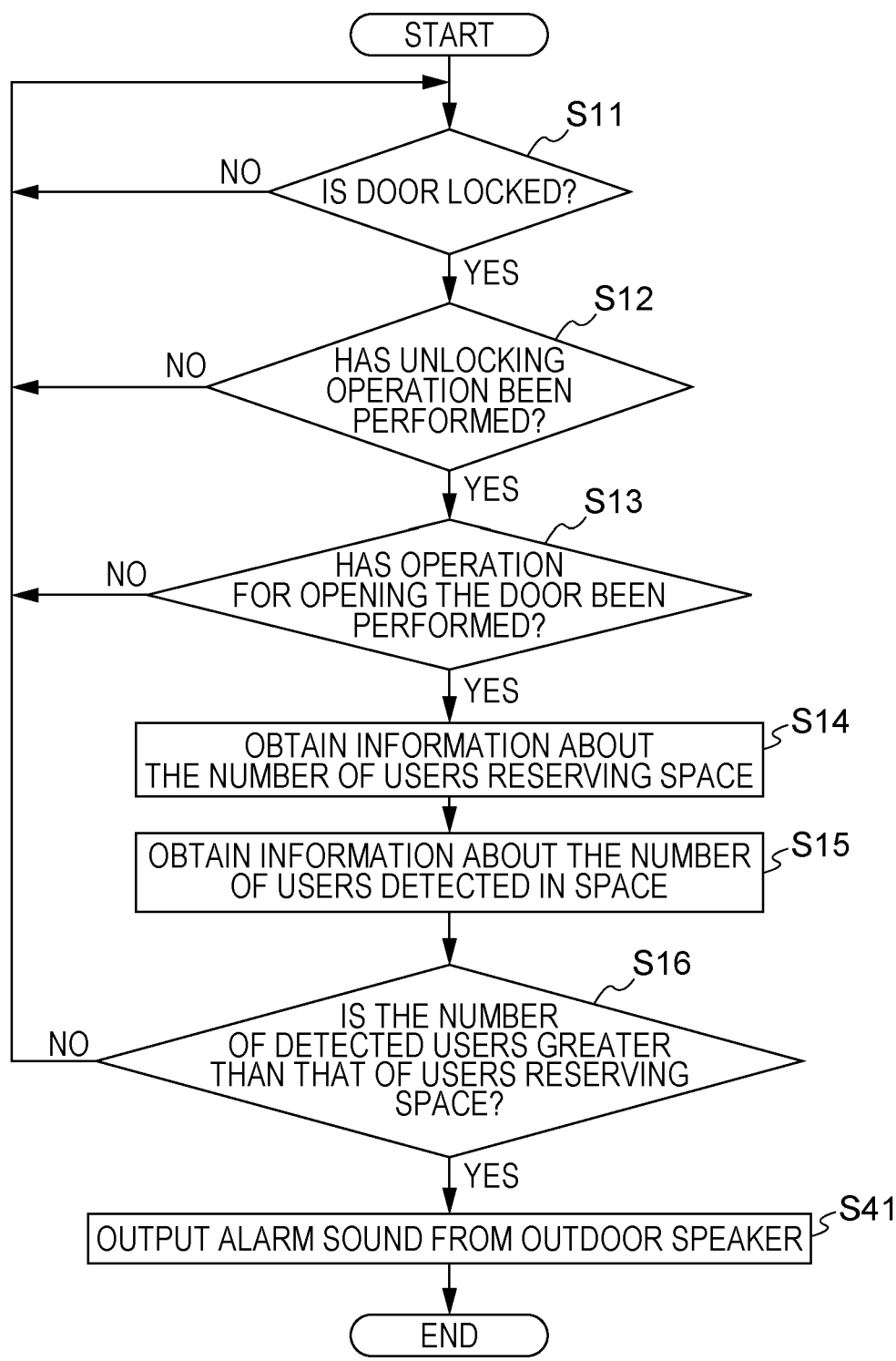
FIG. 14 is a flowchart illustrating an example of a control operation executed by the opening-closing controller according to a fourth example.
Figure 15:
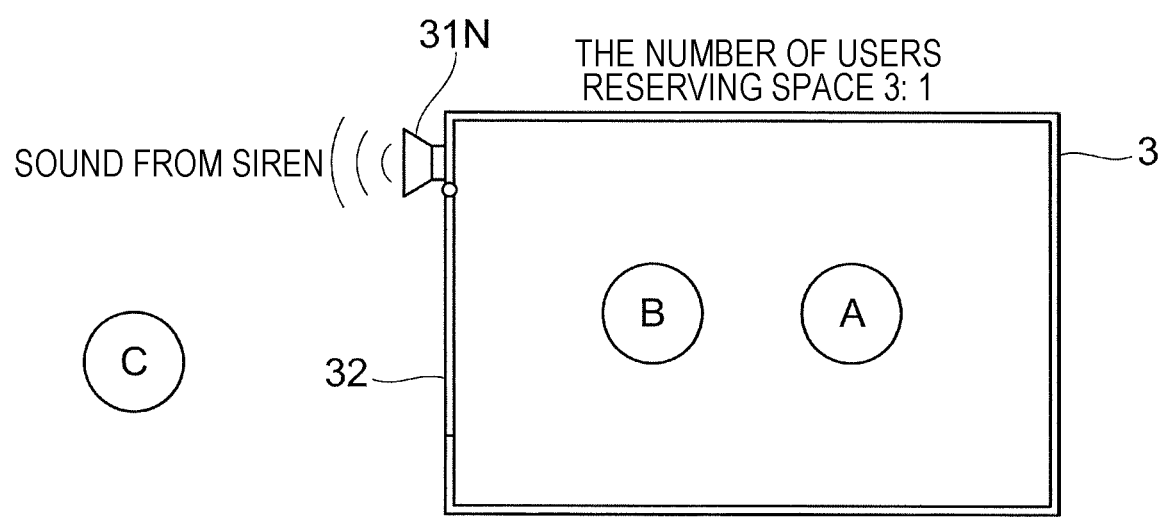
FIG. 15 illustrates a state in which sound from a siren is output from an outdoor speaker to the outside.

FIG. 14 is a flowchart illustrating an example of the control operation executed by the opening-closing controller 101 according to the fourth example. In FIG. 14, steps corresponding to those shown in FIG. 7 are designated by like step numbers. FIG. 15 illustrates a state in which the sound from a siren is output from the outdoor speaker 31N to the outside.

As in the first example, the opening-closing controller 101 first judges in step S11 whether the door 32 is locked.

While the result of step S11 is NO, the opening-closing controller 101 repeats step S11.

If the result of step S11 is YES, the opening-closing controller 101 judges in step S12 whether an unlocking operation has been performed. If the result of step S12 is NO, the opening-closing controller 101 returns to step S11.

If the result of step S12 is YES, the opening-closing controller 101 judges in step S13 whether an operation for opening the door 32 has been performed.

If the result of step S13 is NO, the opening-closing controller 101 returns to step S11.

If the result of step S13 is YES, the opening-closing controller 101 obtains information about the number of users reserving the space 3 in step S14, and obtains information about the number of users detected in the space 3 in step S15.

Then, the opening-closing controller 101 judges in step S16 whether the number of detected users is greater than that of users reserving the space 3.

If the result of step S16 is NO, the opening-closing controller 101 returns to step S11.

The above-described operations are the same as those in the first example.

If the result of step S16 is YES, the opening-closing controller 101 performs control in step S41 so as to output alarm sound, such as sound from a siren, from the outdoor speaker 31N to the outside.

Outputting alarm sound attracts the attention of a passerby, such as user C. This may be more effective in stopping user A and user B from using the space 3 in an unforeseen situation.

Fifth Example

Figure 17A:
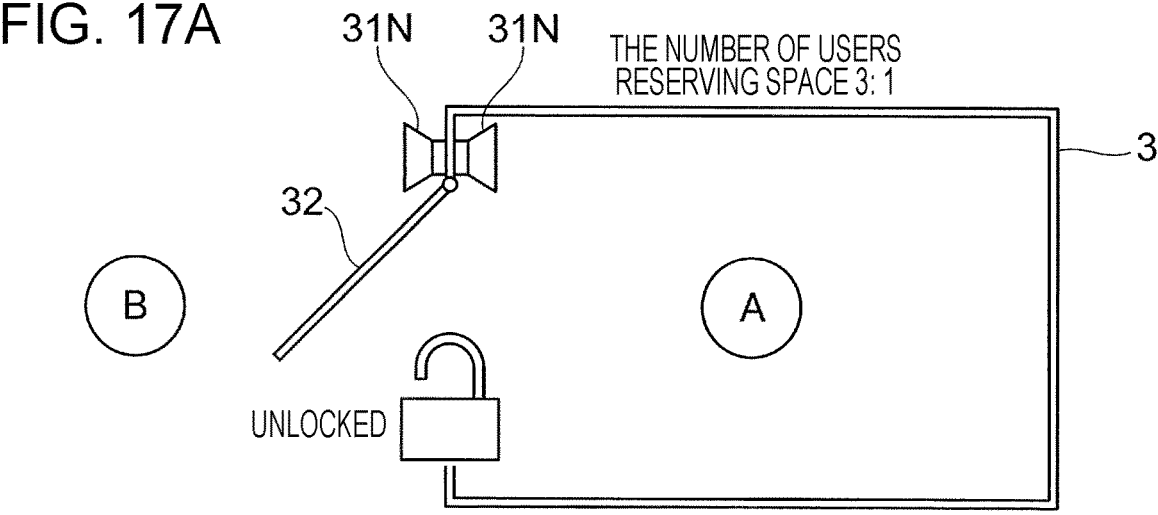
FIGS. 17A through 17C illustrate an example of a control operation when an abnormal incident has been detected from imaging data output from a monitor camera.
Figure 17B:
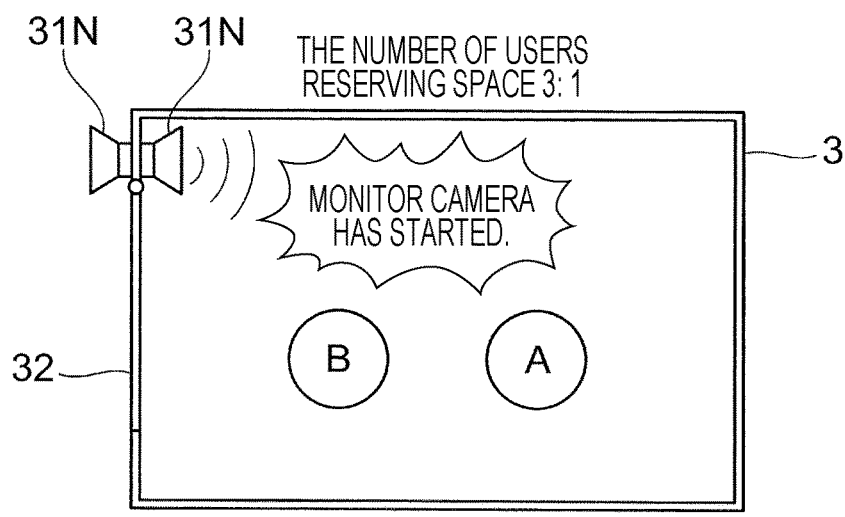
Figure 17C:
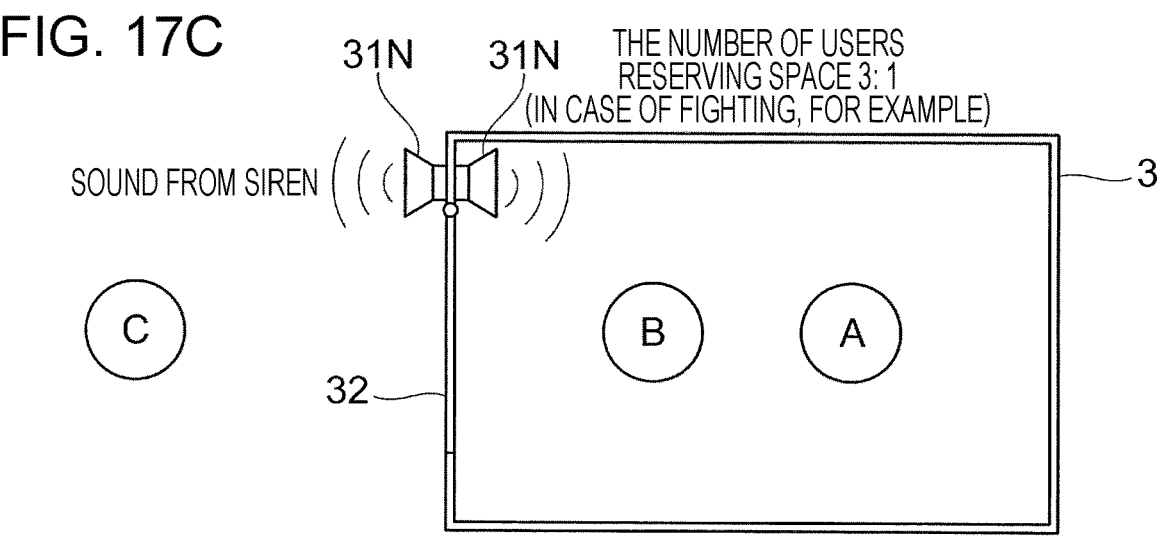

A fifth example of the control operation executed by the opening-closing controller 101 will be discussed below with reference to FIGS. 16 through 17C.

FIG. 16 is a flowchart illustrating an example of the control operation executed by the opening-closing controller 101 according to the fifth example. In FIG. 16, steps corresponding to those shown in FIG. 7 are designated by like step numbers. FIGS. 17A through 17C illustrate an example of the control operation when an abnormal incident has been detected from imaging data output from the monitor camera 31L. FIG. 17A shows a state in which an unlocking operation has been performed. FIG. 17B shows a state in which the monitor camera 31L has started functioning. FIG. 17C shows a state in which an alarm unit has started functioning.

As in the first example, the opening-closing controller 101 first judges in step S11 whether the door 32 is locked.

While the result of step S11 is NO, the opening-closing controller 101 repeats step S11.

If the result of step S11 is YES, the opening-closing controller 101 judges in step S12 whether an unlocking operation has been performed. If the result of step S12 is NO, the opening-closing controller 101 returns to step S11.

If the result of step S12 is YES, the opening-closing controller 101 judges in step S13 whether an operation for opening the door 32 has been performed.

If the result of step S13 is NO, the opening-closing controller 101 returns to step S11.

If the result of step S13 is YES, the opening-closing controller 101 obtains information about the number of users reserving the space 3 in step S14, and obtains information about the number of users detected in the space 3 in step S15.

Then, the opening-closing controller 101 judges in step S16 whether the number of detected users is greater than that of users reserving the space 3.

If the result of step S16 is NO, the opening-closing controller 101 returns to step S11.

The above-described operations are the same as those in the first example.

If the result of step S16 is YES, the opening-closing controller 101 performs control so as to start the monitor camera 31L in step S51. When the monitor camera 31L has started to monitor the space 3, a voice message, such as "Monitor camera has started.", is output from the indoor speaker 31N, as shown in FIG. 17B. This may be psychologically effective in stopping user A and user B from causing any trouble. Without such a voice message, it means that the monitor camera 31L is not functioning, and users can be reassured.

Then, the opening-closing controller 101 performs image processing on imaging data output from the monitor camera 31L and judges in step S52 whether an abnormal incident is occurring. An example of the abnormal incident is some actions that may be observed in the case of fighting.

If the result of step S52 is NO, the opening-closing controller 101 returns to step S11. Step S52 is desirably repeated until a predetermined condition is satisfied. For example, if only one user is within the space 3, trouble between users will not occur, and the monitor camera 31L stops functioning.

If the result of step S52 is YES, the opening-closing controller 101 starts an alarm unit in step S53. An example of the alarm unit is the outdoor speaker 31N. In the state in FIG. 17C, alarm sound, such as sound from a siren, is being output from the outdoor speaker 31N.

Outputting alarm sound attracts the attention of a passerby, such as user C. This may be more effective in stopping user A and user B from using the space 3 in an unforeseen situation.

Instead of alarm sound, alarm light may be turned ON, or the occurrence of an abnormal incident may be reported to a security company. As in the third example, voice uttered by user A and that by user B in the space 3 may be output from the outdoor speaker 31N.

The timing at which the monitor camera 31N is started is not limited to that shown in FIG. 16.

Figure 18:
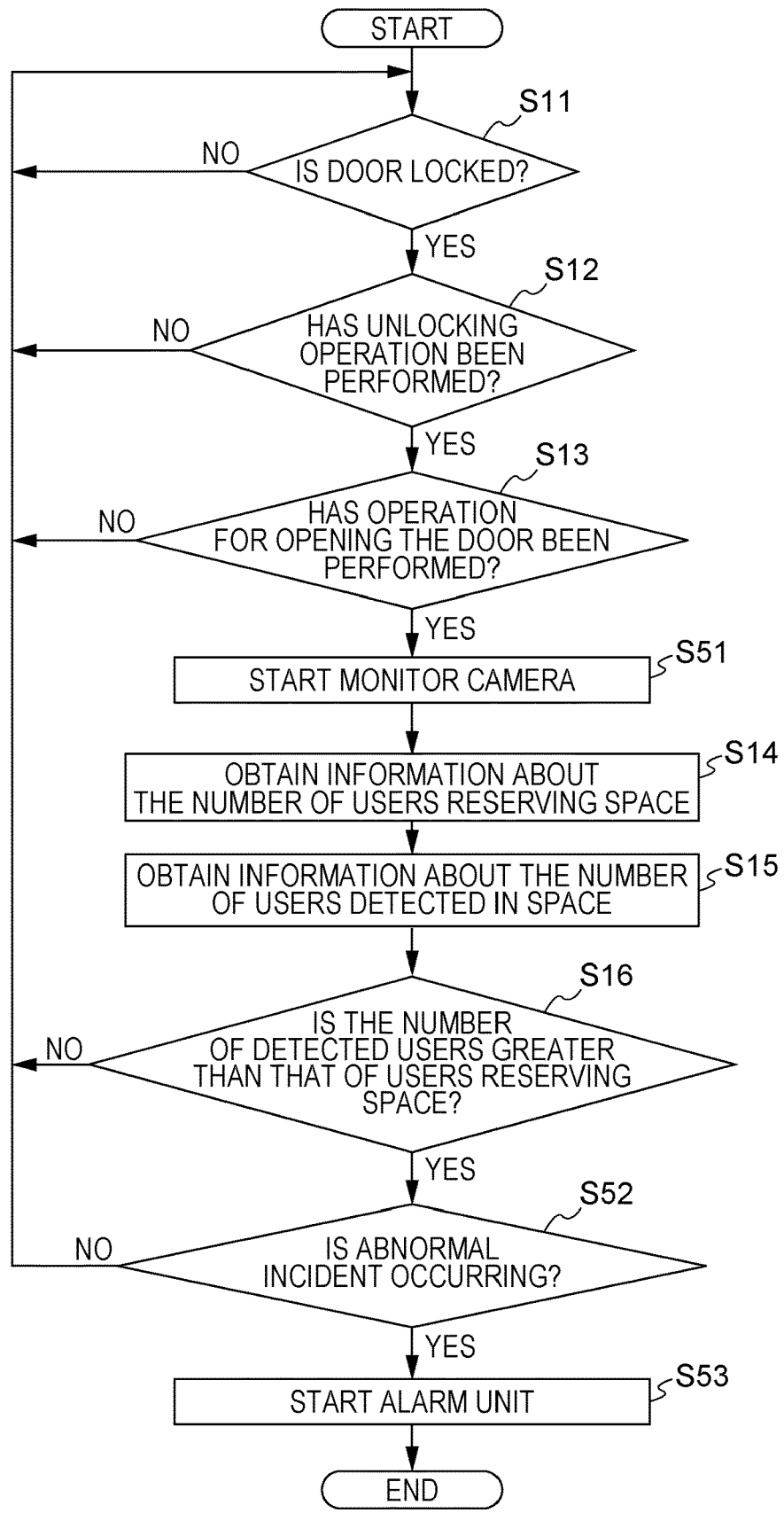
FIG. 18 is a flowchart illustrating another example of the control operation executed by the opening-closing controller according to the fifth example.

FIG. 18 is a flowchart illustrating another example of the control operation executed by the opening-closing controller 101 according to the fifth example. In FIG. 18, steps corresponding to those shown in FIG. 16 are designated by like step numbers. In the example in FIG. 18, the monitor camera 31L is started when the operation for opening the door 32 has been detected. In this case, the monitor camera 31L starts monitoring the space 3 when a user has entered or left the space 3. In this example, too, outputting a voice message from the indoor speaker 31N that the monitor camera 31L has started gives a certain warning to a user entering or leaving a space 3 and the third party, such as a passerby.

Sixth Example

A sixth example of the control operation executed by the opening-closing controller 101 will be discussed below with reference to FIG. 19.

Figure 19:
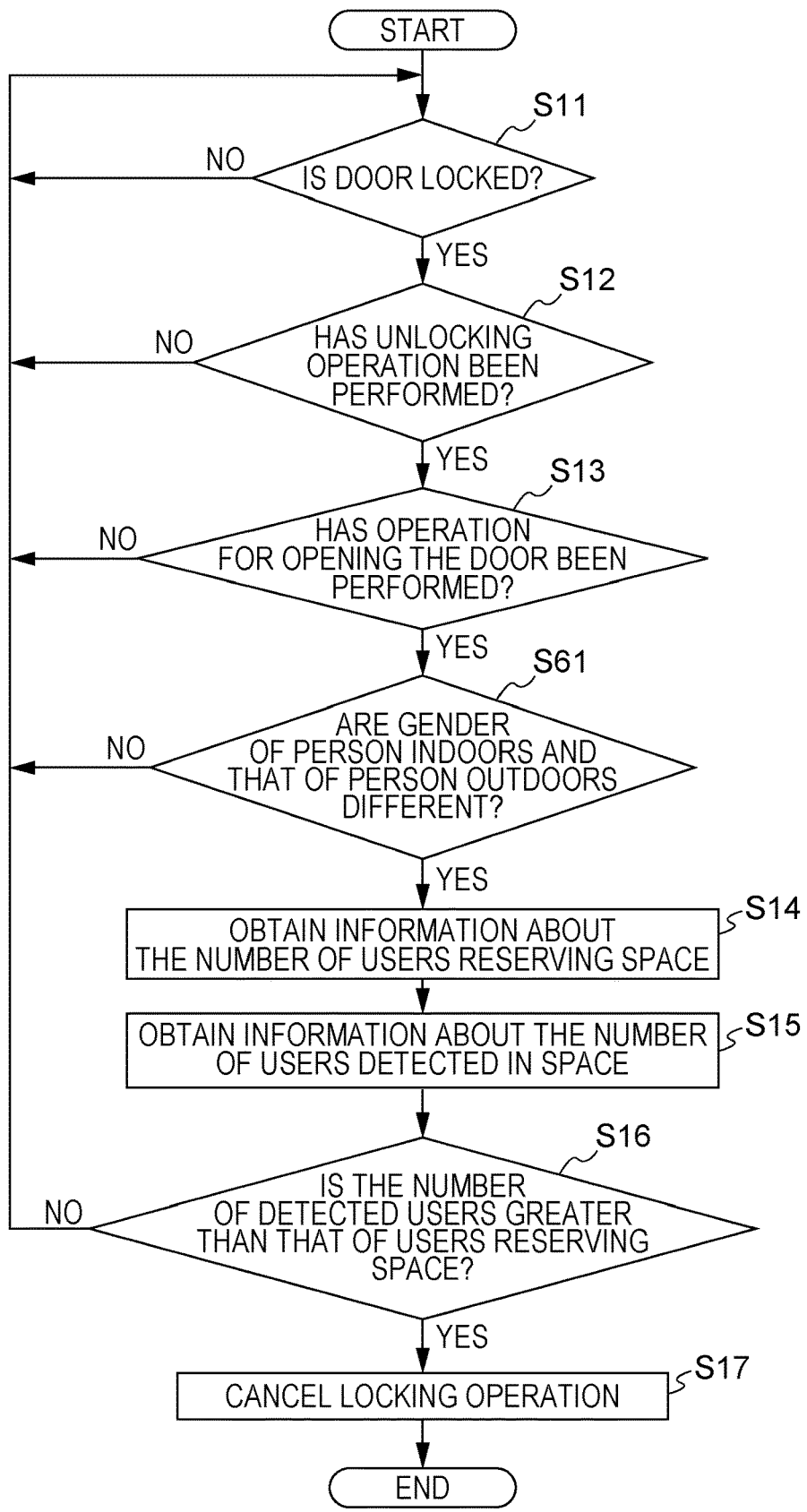
FIG. 19 is a flowchart illustrating an example of a control operation executed by the opening-closing controller according to a sixth example.

FIG. 19 is a flowchart illustrating an example of the control operation executed by the opening-closing controller 101 according to the sixth example. In FIG. 19, steps corresponding to those shown in FIG. 7 are designated by like step numbers.

As in the first example, the opening-closing controller 101 first judges in step S11 whether the door 32 is locked.

While the result of step S11 is NO, the opening-closing controller 101 repeats step S11.

If the result of step S11 is YES, the opening-closing controller 101 judges in step S12 whether an unlocking operation has been performed. If the result of step S12 is NO, the opening-closing controller 101 returns to step S11.

If the result of step S12 is YES, the opening-closing controller 101 judges in step S13 whether an operation for opening the door 32 has been performed.

If the result of step S13 is NO, the opening-closing controller 101 returns to step S11.

If the result of step S13 is YES, the opening-closing controller 101 judges whether the gender of a person indoors and that of a person outdoors are different in step S61. Usually, greater consideration is required for people of the opposite genders than those of the same gender. The gender of a person indoors and that of a person outdoors may be checked by using information registered when a reservation has been made in the space 3 or may be identified by performing image processing on imaging data output from the monitor cameras 31L installed indoors and outdoors. The gender may be identified based on the height and body shape or the pitch of the voice (high or low).

If the result of step S61 is NO, the opening-closing controller 101 returns to step S11. If the result of step S61 is YES, the opening-closing controller 101 obtains information about the number of users reserving the space 3 in step S14, and obtains information about the number of users detected in the space 3 in step S15.

Then, the opening-closing controller 101 judges in step S16 whether the number of detected users is greater than that of users reserving the space 3.

If the result of step S16 is NO, the opening-closing controller 101 returns to step S11.

If the result of step S16 is YES, the opening-closing controller 101 performs control so as to cancel a locking operation in step S17. Steps S14 through S16 are the same as those in the first example.

The sixth example may be combined with one or some of the second through fifth examples.

Seventh Example

A seventh example of the control operation executed by the opening-closing controller 101 will be discussed below with reference to FIG. 20.

Figure 20:
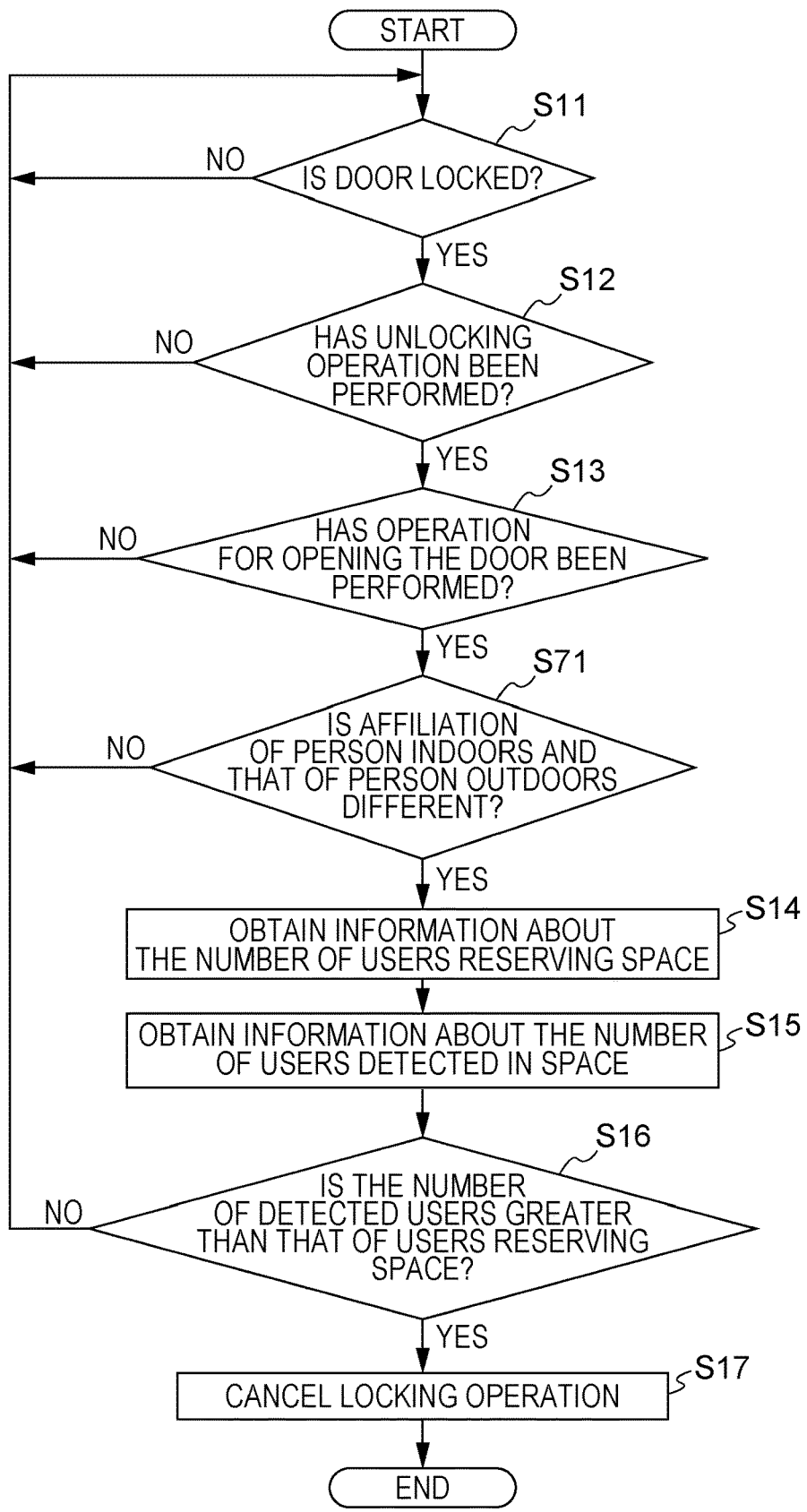
FIG. 20 is a flowchart illustrating an example of a control operation executed by the opening-closing controller according to a seventh example.

FIG. 20 is a flowchart illustrating an example of the control operation executed by the opening-closing controller 101 according to the seventh example. In FIG. 20, steps corresponding to those shown in FIG. 7 are designated by like step numbers.

As in the first example, the opening-closing controller 101 first judges in step S11 whether the door 32 is locked.

While the result of step S11 is NO, the opening-closing controller 101 repeats step S11.

If the result of step S11 is YES, the opening-closing controller 101 judges in step S12 whether an unlocking operation has been performed. If the result of step S12 is NO, the opening-closing controller 101 returns to step S11.

If the result of step S12 is YES, the opening-closing controller 101 judges in step S13 whether an operation for opening the door 32 has been performed.

If the result of step S13 is NO, the opening-closing controller 101 returns to step S11.

If the result of step S13 is YES, the opening-closing controller 101 judges whether the affiliation of a user indoors and that of a user outdoors are different in step S71. The affiliation may be identified by using information registered when a reservation has been made in the space 3, for example. If the name of a legal entity of one user is different from that of the other user, the result of step S71 becomes YES. If the name of a legal entity of one user and that of the other user are the same, the result of step S71 becomes NO. If the two users belong to the same affiliation, the possibility that trouble will occur may be smaller.

If the result of step S71 is NO, the opening-closing controller 101 returns to step S11. If the result of step S71 is YES, the opening-closing controller 101 obtains information about the number of users reserving the space 3 in step S14, and obtains information about the number of users detected in the space 3 in step S15.

Then, the opening-closing controller 101 judges in step S16 whether the number of detected users is greater than that of users reserving the space 3.

If the result of step S16 is NO, the opening-closing controller 101 returns to step S11.

If the result of step S16 is YES, the opening-closing controller 101 performs control so as to cancel a locking operation in step S17. Steps S14 through S17 are the same as those in the first example.

The seventh example may be combined with one or some of the second through fifth examples.

Eighth Example

An eighth example of the control operation executed by the opening-closing controller 101 will be discussed below with reference to FIGS. 21 through 22B.

Figure 21:
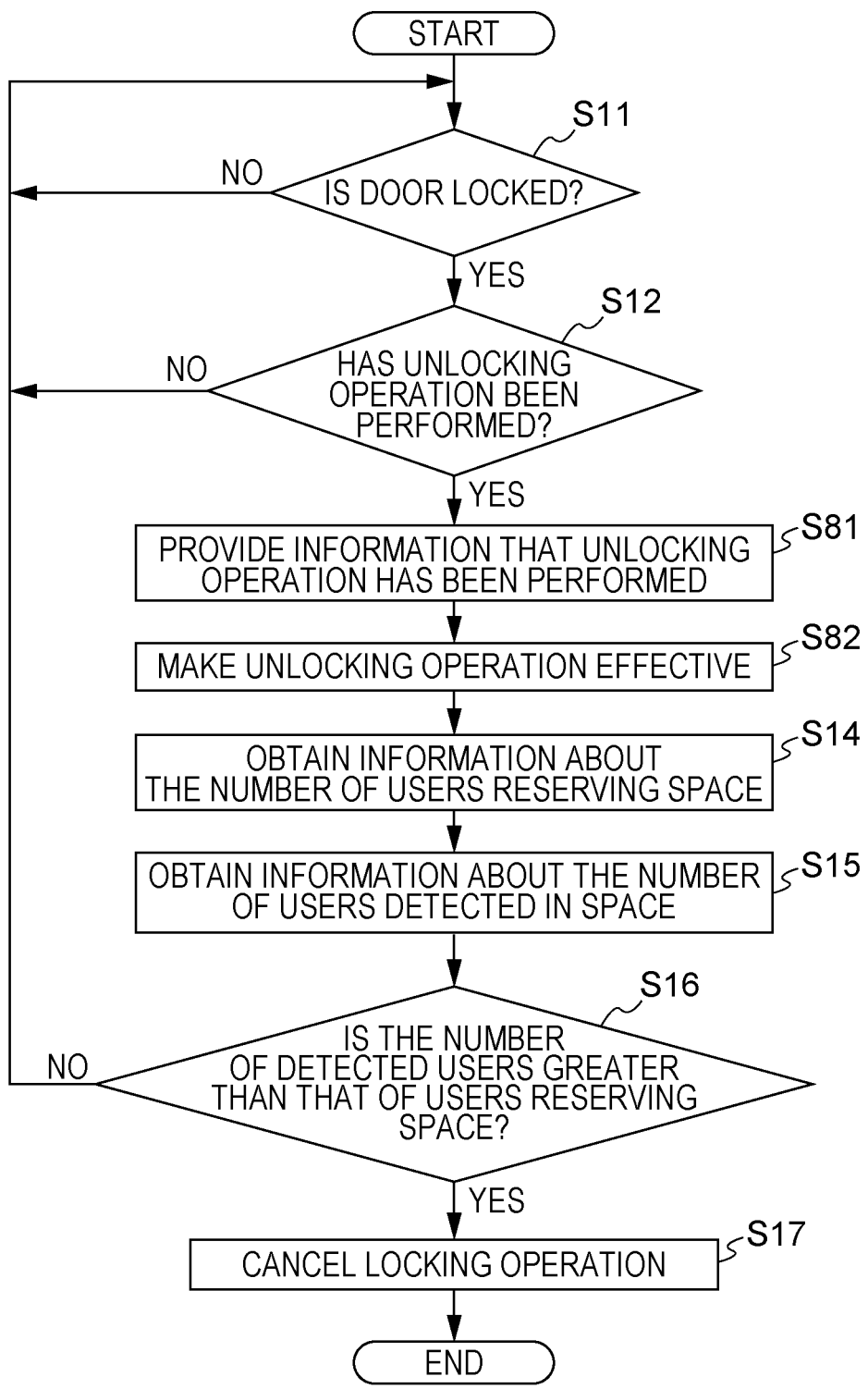
FIG. 21 is a flowchart illustrating an example of a control operation executed by the opening-closing controller according to an eighth example.
Figure 22A:
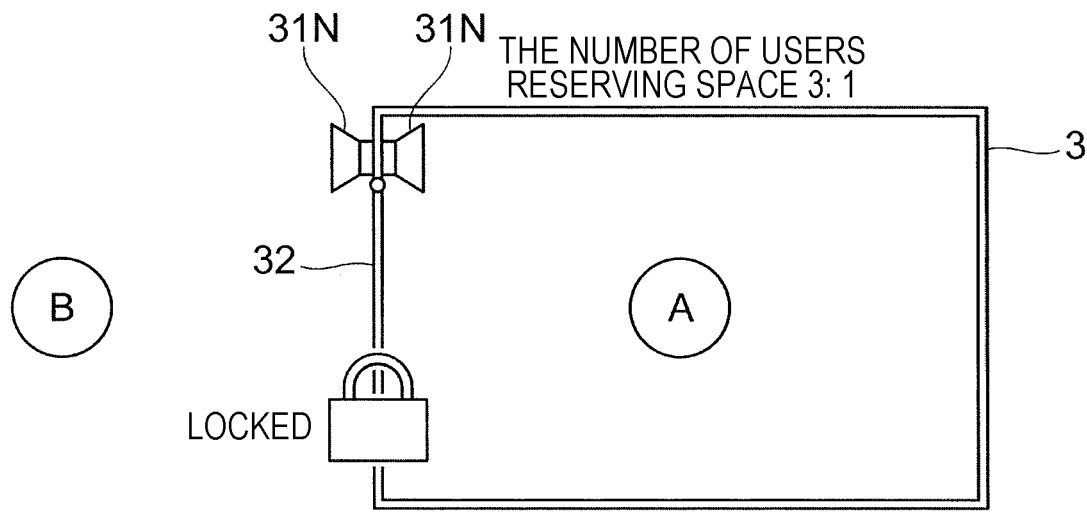
FIGS. 22A and 22B illustrate an example of an operation for providing information about the execution of an unlocking operation so as not to make a user startled by the presence of another user.
Figure 22B:
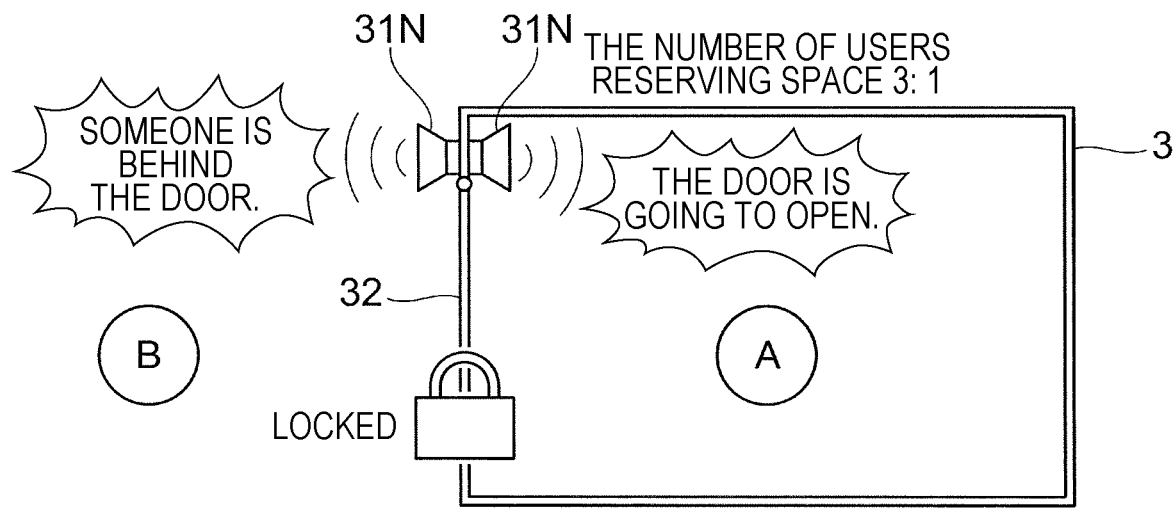

FIG. 21 is a flowchart illustrating an example of the control operation executed by the opening-closing controller 101 according to the eighth example. In FIG. 21, steps corresponding to those shown in FIG. 7 are designated by like step numbers. FIGS. 22A and 22B illustrate an example of an operation for providing information about the execution of an unlocking operation so as not to make a user startled by the presence of another user. FIG. 22A shows a state before an unlocking operation is performed. FIG. 22B shows a state immediately after an unlocking operation has been performed.

As in the first example, the opening-closing controller 101 first judges in step S11 whether the door 32 is locked.

While the result of step S11 is NO, the opening-closing controller 101 repeats step S11.

If the result of step S11 is YES, the opening-closing controller 101 judges in step S12 whether an unlocking operation has been performed. If the result of step S12 is NO, the opening-closing controller 101 returns to step S11.

If the result of step S12 is YES, the opening-closing controller 101 provides information that the unlocking operation has been performed in step S81. For example, as shown in FIG. 22B, a warning "Someone is behind the door." is provided to user B outside the space 3, while a warning "The door is going to open." is provided to user A inside the space 3. This makes a user indoors and that outdoors be aware of the presence of the other user, thereby decreasing the possibility that trouble will occur.

In the eighth example, after information about the execution of the unlocking operation has been provided in step S81, the unlocking operation is made effective in step S82. In other words, such information is provided to a user before the user enters or leaves a space 3. This makes it possible for both users to have some time before facing each other, thereby decreasing the possibility that trouble will occur. The time from when the unlocking operation is performed or information about the execution of the unlocking operation is provided until the unlocking operation is made effective is determined in advance.

The opening-closing controller 101 then obtains information about the number of users reserving the space 3 in step S14, and obtains information about the number of users detected in the space 3 in step S15.

Then, the opening-closing controller 101 judges in step S16 whether the number of detected users is greater than that of users reserving the space 3.

If the result of step S16 is NO, the opening-closing controller 101 returns to step S11.

If the result of step S16 is YES, the opening-closing controller 101 performs control so as to cancel a locking operation in step S17. Steps S14 through S17 are the same as those in the first example.

The eighth example may be combined with one or some of the second through fifth examples.

[Other Exemplary Embodiments]

The exemplary embodiment of the invention has been discussed above. However, the technical scope of the invention is not restricted to the exemplary embodiment. Various modifications and/or improvements may be made, and exemplary embodiments based on such modifications and improvements are also encompassed within the technical scope of the invention.

Figure 23:
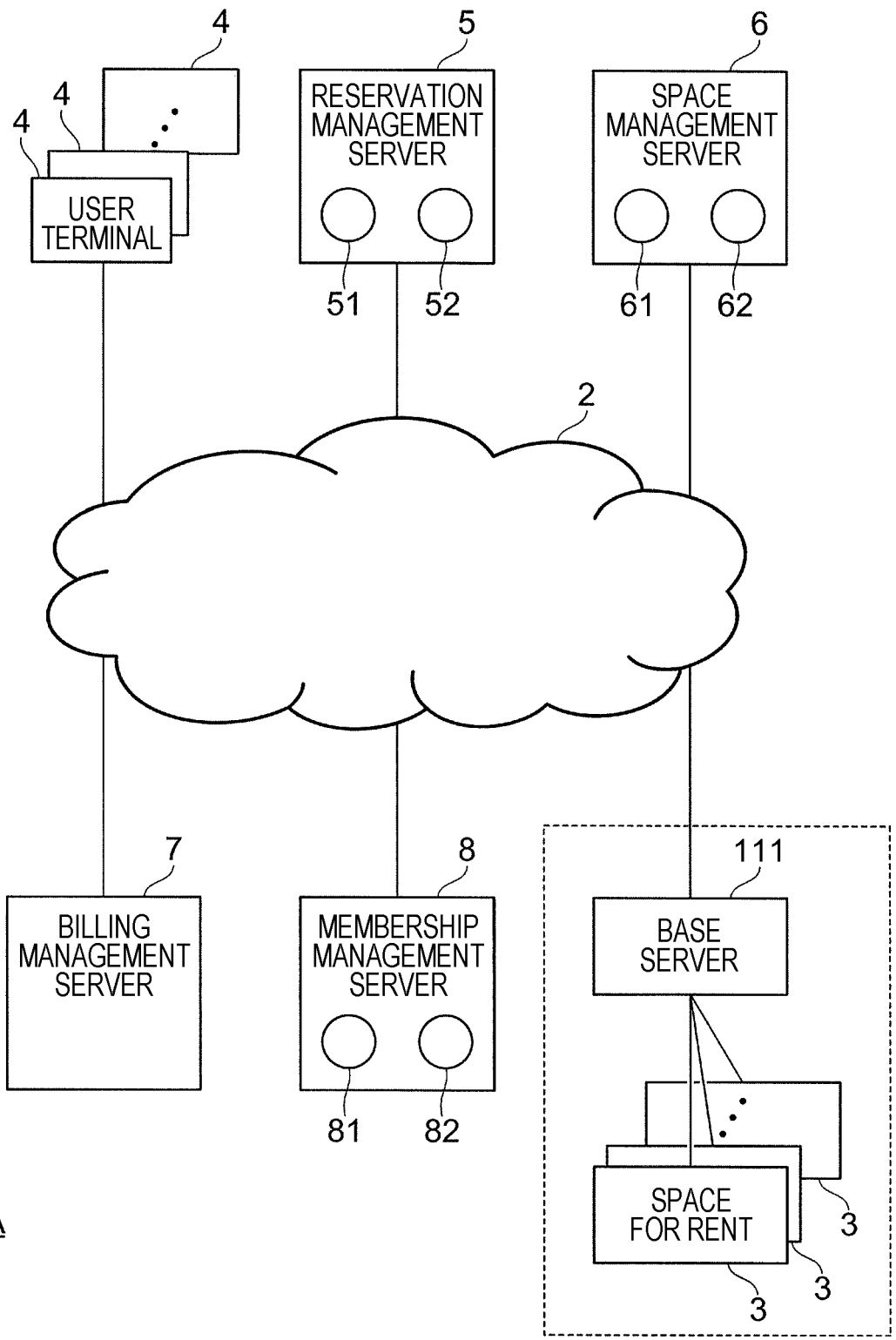
FIG. 23 schematically illustrates another example of the configuration of a management system.

The management system 1 (see FIG. 1) is not restricted to the above-described configuration. FIG. 23 schematically illustrates another example of the configuration of the management system 1, that is, the configuration of a management system 1A. In FIG. 23, elements corresponding to those in FIG. 1 are designated by like reference numerals. The management system 1A is different from the management system 1 in that a base server 111 is used for managing the plural spaces 3. The base server 111 configured as a computer may perform the functions of the opening-closing controller 101 (see FIG. 6) by executing a program. In this sense, the base server 111 is an example of the apparatus.

In the above-described exemplary embodiment, a small room having a soundproof function, such as that shown in FIG. 2, is assumed as a space 3. However, meeting rooms, study rooms, and various types of guest rooms may be used as spaces 3 if reservations are required to be made for renting the spaces 3.

The above-described exemplary embodiment has been described, assuming that the door 32 can be locked. However, the above-described control function is still applicable when the door 32 is not possible to lock.

In the above-described exemplary embodiment, the spaces 3 are rented on a time basis. However, the spaces 3 may be rented based on another factor.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An apparatus comprising:
controller that performs control of an entrance of a space,
wherein the controller obtains, from a server, a number of people reserving the space and a reserved time period after a door unlocking operation and a door opening operation have been performed,
wherein the controller detects a number of people that have entered the space, and when the number of people detected in the space is greater than the number of people reserving the space during the reserved time period, the controller does not allow the space to be locked, and
wherein when the number of people detected in the space is not greater than the number of people reserving the space during the reserved time period, the controller allows the space to be locked.

2. The apparatus according to claim 1, wherein the number of people in the space is detected by output from a sensor.

3. The apparatus according to claim 2, wherein the sensor is a human detecting sensor.

4. The apparatus according to claim 1, wherein, after detecting that an operation for setting the entrance in a state in which the entrance is open has been performed, the controller performs control so as to set the entrance in a state in which the entrance is open.

5. The apparatus according to claim 4, wherein the operation is an unlocking operation.

6. The apparatus according to claim 4, wherein the operation is an operation for opening a door.

7. The apparatus according to claim 1, wherein, if the number of people detected in the space is found to be greater than the number of people reserving the space, the controller cancels a locking operation.

8. The apparatus according to claim 1, wherein, if the number of people detected in the space is found to be greater than the number of people reserving the space, the controller maintains a door at a position at which the door is open.

9. The apparatus according to claim 8, wherein the controller performs control so that the door will not move in a direction in which the door is closed.

10. The apparatus according to claim 9, wherein the controller allows an operation for opening the door to be performed.

11. The apparatus according to claim 1, wherein, if the number of people detected in the space is found to be greater than the number of people reserving the space, the controller drives a door so that an opening area of the space will become greater than an opening area of the space at a time at which the number of people detected in the space has been found to be greater than the number of people reserving the space.

12. The apparatus according to claim 1, wherein, if the number of people detected in the space is found to be greater than the number of people reserving the space, the controller causes an outdoor speaker to output indoor sound.

13. The apparatus according to claim 1, wherein, if the number of people detected in the space is found to be greater than the number of people reserving the space, the controller starts an outdoor alarm unit.

14. The apparatus according to claim 1, wherein, if an operation for opening a door is detected, the controller starts a monitor camera to monitor the space.

15. The apparatus according to claim 14, wherein the controller informs a person inside the space that the monitor camera has started to monitor the space.

16. The apparatus according to claim 14, wherein, if an abnormal incident is found, the controller starts an alarm unit.

17. The apparatus according to claim 1, wherein, if the number of people detected in the space is found to be greater than the number of people reserving the space, the controller starts a monitor camera to monitor the space.

18. The apparatus according to claim 1, wherein, if gender of a person inside the space and gender of a person outside the space are different, the controller performs control so as to set the entrance in a state in which the entrance is open.

19. The apparatus according to claim 18, wherein the controller identifies the gender of the person inside the space and the gender of the person outside the space by using information obtained when authentication is conducted for an unlocking operation.

20. The apparatus according to claim 18, wherein the controller identifies the gender of the person inside the space and the gender of the person outside the space by using information obtained by analyzing captured images of the person inside the space and the person outside the space.

21. The apparatus according to claim 1, wherein, if information concerning an affiliation of a person inside the space and information concerning an affiliation of a person outside the space satisfy a predetermined condition, the controller performs control so as to set the entrance in a state in which the entrance is open.

22. The apparatus according to claim 21, wherein the predetermined condition is a condition that the affiliation of the person inside the space and the affiliation of the person outside the space are different.

23. The apparatus according to claim 22, wherein a registered name of a legal entity of the person inside the space and a registered name of a legal entity of the person outside the space are different.

24. The apparatus according to claim 1, wherein, if an unlocking operation is detected, the controller provides information by using an informing unit that the unlocking operation has been performed.

25. The apparatus according to claim 24, wherein the controller provides the information after the unlocking operation has been performed and before a door is opened.

26. The apparatus according to claim 24, wherein the controller provides the information before someone enters the space or someone leaves the space.

27. The apparatus according to claim 24, wherein the controller provides the information before the unlocking operation is made effective.

28. The apparatus according to claim 24, wherein the unlocking operation is made effective after the controller has provided the information.

29. The apparatus according to claim 28, wherein the unlocking operation is made effective after the lapse of a predetermined time after the controller has provided the information.

30. The apparatus according to claim 28, wherein the unlocking operation is made effective after the lapse of a predetermined time after the unlocking operation has been performed.

31. A management system comprising:
a control device that performs control of an entrance of a space,
wherein the control device obtains, from a server, a number of people reserving the space and a reserved time period after a door unlocking operation and a door opening operation have been performed,
wherein the control device detects a number of people that have entered the space, and when the number of people detected in the space is greater than the number of people reserving the space during the reserved time period, the controller does not allow the space to be locked, and
wherein when the number of people detected in the space is not greater than the number of people reserving the space during the reserved time period, the controller allows the space to be locked.

32. A non-transitory computer readable medium storing a program causing a computer to execute a process, the process comprising:
performing control of an entrance of a space,
obtaining, from a server, a number of people reserving the space and a reserved time period after a door unlocking operation and a door opening operation have been performed;
detecting a number of people that have entered the space, and when the number of people detected in the space is greater than the number of people reserving the space during the reserved time period, not allowing the space to be locked, and
when the number of people detected in the space is not greater than the number of people reserving the space during the reserved time period, allowing the space to be locked.

* * * * *